(12) United States Patent  
Hatakeyama et al.

(10) Patent No.: US 7,516,947 B2  
(45) Date of Patent: Apr. 14, 2009

(54) LIQUID-SEALED VIBRATION CONTROL EQUIPMENT AND ELASTIC PARTITION FILM FOR USE THEREIN

(75) Inventors: Shingo Hatakeyama, Osaka (JP); Masaaki Itoh, Osaka (JP); Kentarou Yamamoto, Osaka (JP); Yasuhiro Tanaka, Osaka (JP)

(73) Assignee: Toyo Tire & Rubber Co., Ltd., Osaka-shi (JP)

(*) Notice: Subject to any disclaimer, the term of this patent is extended or adjusted under 35 U.S.C. 154(b) by 530 days.

(21) Appl. No.: 10/536,903

(22) PCT Filed: Mar. 31, 2004

(86) PCT No.: PCT/JP2004/004743

§ 371 (c)(1),  
(2), (4) Date: May 27, 2005

(87) PCT Pub. No.: WO2004/090374

PCT Pub. Date: Oct. 21, 2004

(65) Prior Publication Data

US 2006/0071381 A1  Apr. 6, 2006

(30) Foreign Application Priority Data

Apr. 4, 2003 (JP) ............................. 2003-102031  
Apr. 4, 2003 (JP) ............................. 2003-102178

(51) Int. Cl.  
*F16F 13/10* (2006.01)

(52) U.S. Cl. .................. 267/140.13; 267/219

(58) Field of Classification Search ............ 267/140.11, 267/140.13, 140.14, 219  
See application file for complete search history.

(56) References Cited

U.S. PATENT DOCUMENTS 5,443,245 A   8/1995   Bellamy et al.

FOREIGN PATENT DOCUMENTS

| EP | 0 596 787 A1 | 5/1994 |
|----|--------------|--------|
| FR | 2674590 A1 * | 10/1992 |
| FR | 2 697 604 | 5/1994 |
| JP | 63-9537 | 1/1988 |
| JP | 64-49731 | 2/1989 |
| JP | 3-288036 | 12/1991 |
| JP | 6-221368 | 8/1994 |

(Continued)

*Primary Examiner*—Bradley T King  
(74) *Attorney, Agent, or Firm*—Westerman, Hattori, Daniels & Adrian, LLP.

(57) ABSTRACT

A hydraulic antivibration device capable of sufficiently reducing strange sounds is provided. The one in a first embodiment includes first ribs whose tops are spaced apart from lattice members and second ribs having tops abutting on the lattice members and a smaller rib width than the first ribs. When an elastic partition membrane impinges on the lattice members with vibration, the second ribs resist and the elastic partition membrane impinges moderately on the lattice members, so that strange sounds can be reduced. In a second embodiment, such first and second displacement-regulating protrusions are provided that are disposed asymmetrically relative to a phantom plane passing through a center of the elastic partition membrane in its thickness direction. When the elastic partition membrane is displaced, the displacement-regulating protrusions on the opposite side to the displacement direction intensify the stiffness of it locally, so that the elastic partition membrane is difficult to displace, leading to an effective reduction of strange sounds.

5 Claims, 23 Drawing Sheets

FOREIGN PATENT DOCUMENTS

| | | |
|---|---|---|
| JP | 6-307491 | 11/1994 |
| JP | 2002-310223 | 10/2002 |
| JP | 2003-294078 | 10/2003 |
| JP | 2003-294079 | 10/2003 |

* cited by examiner

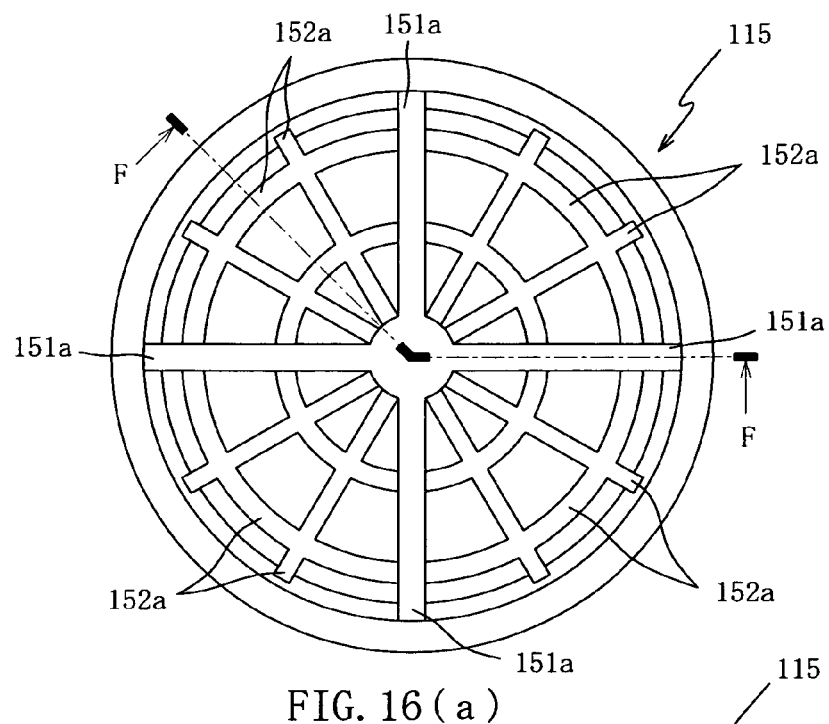
FIG. 16 (a)
FIG. 16 (b)
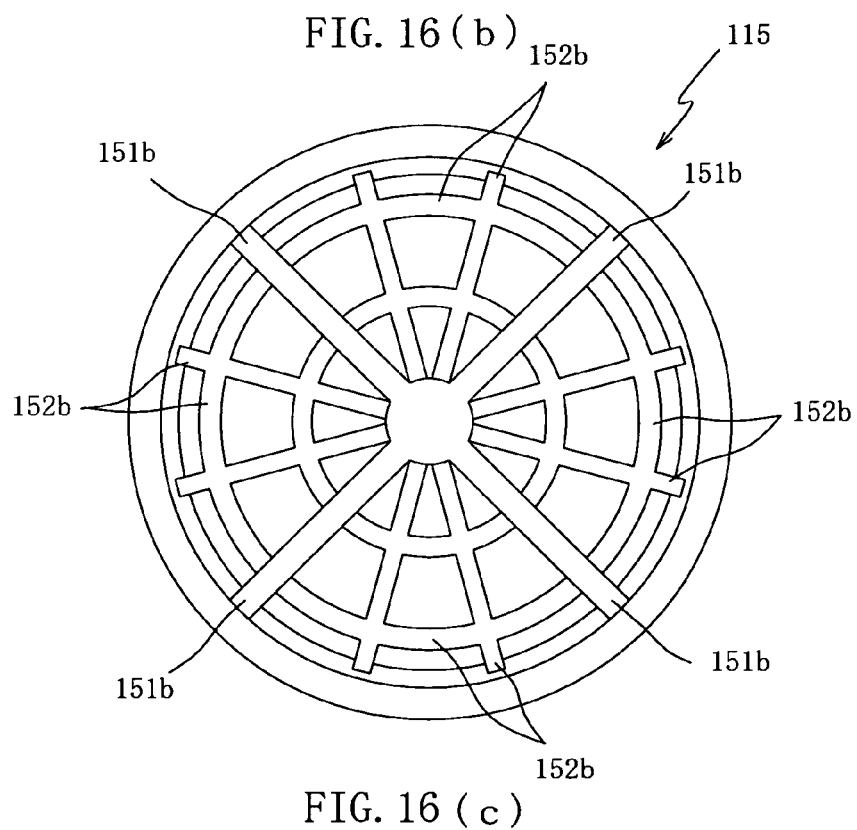
FIG. 16 (c)

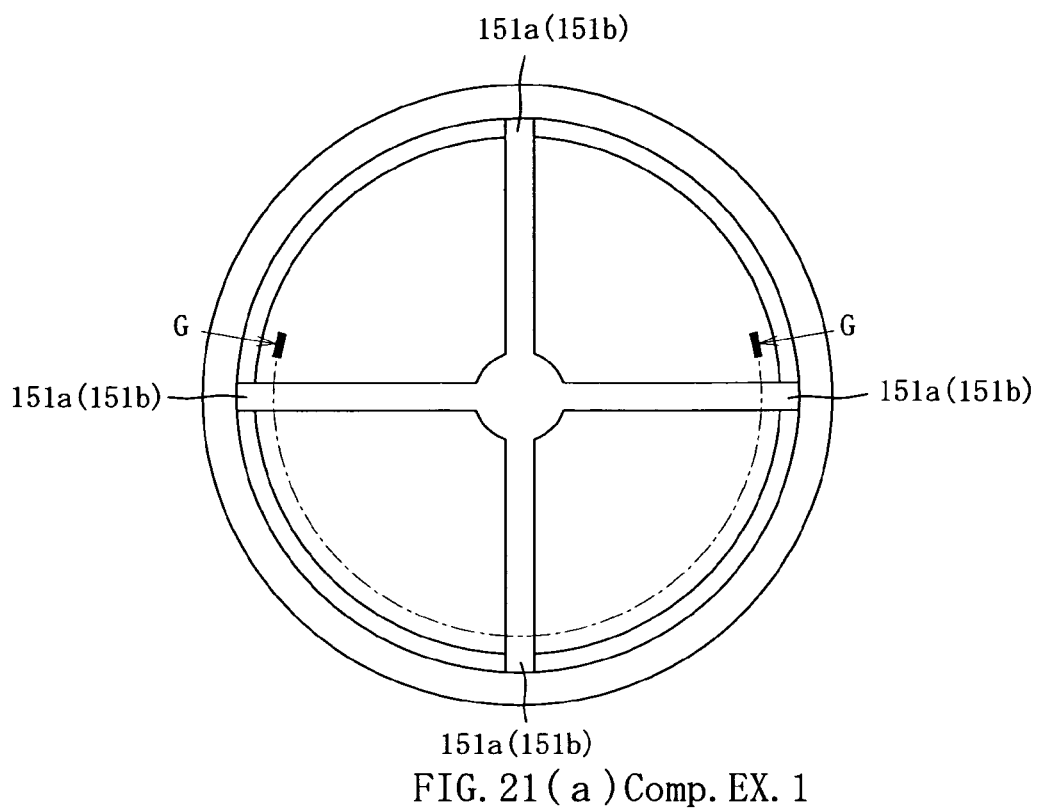
FIG. 21(a) Comp. EX. 1
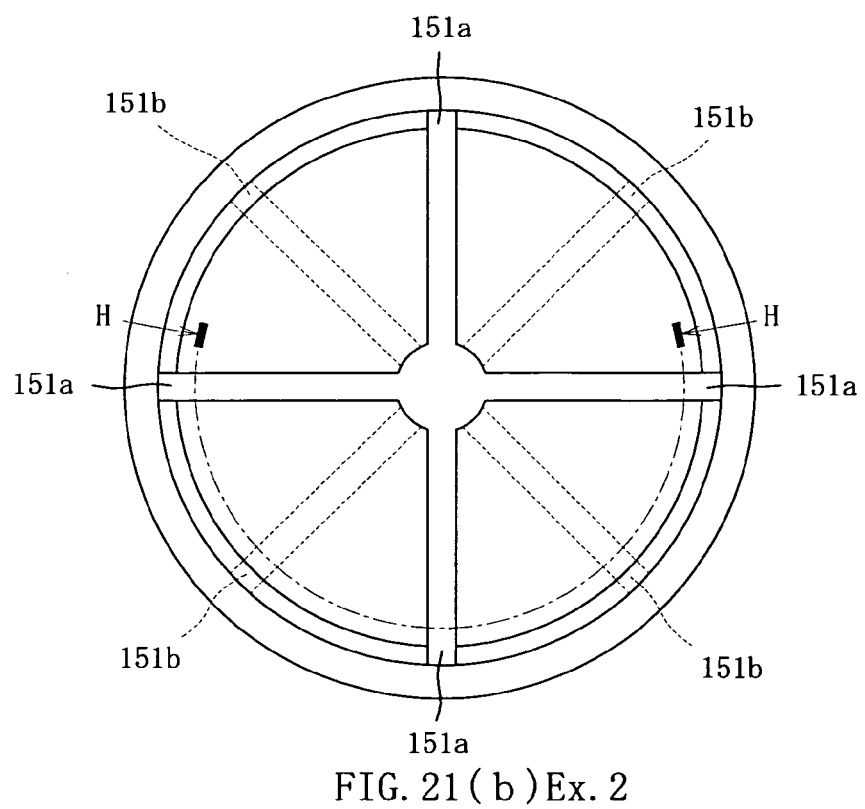
FIG. 21(b) Ex. 2

US 7,516,947 B2

LIQUID-SEALED VIBRATION CONTROL EQUIPMENT AND ELASTIC PARTITION FILM FOR USE THEREIN

TECHNICAL FIELD

This invention relates to a hydraulic style antivibration device which is made up of a first attachment fitting, a cylindrical second attachment fitting, a vibration-isolating base connecting the second attachment fitting and the first attachment fitting together and composed of a rubber-like elastomer, a diaphragm attached to the second attachment fitting to form a liquid-filled chamber between it and the vibration-isolating base, a partition comparting the liquid-filled chamber into a first liquid chamber on the vibration-isolating base side and a second liquid chamber on the diaphragm side, and an orifice bringing the first and second liquid chambers into communication with each other, the partition including an elastic partition membrane and a pair of lattice members regulating the displacement amount of the elastic partition membrane from both sides thereof, and to the elastic partition membrane used for the aforesaid hydraulic antivibration device.

BACKGROUND ART

The aforementioned hydraulic antivibration device is installed, for example, on automobiles between the engine and the vehicle body frame thereof. And when a large amplitude vibration attributable to irregularity of a traveling road surface is generated, the liquid flows through the orifice to fluidize between both liquid chambers thereby damping the vibration by reason of the fluidization effect of the fluid. On the other hand, when a fine amplitude vibration is generated, the elastic partition membrane is subjected to reciprocating deformation to dampen the vibration, without the liquid flowing through between both liquid chambers.

In this type of hydraulic antivibration device, strange (unusual) sounds are liable to be generated when the elastic partition membrane impinges on the lattice members. To cope with that, hitherto the lattice members have been provided with radial ribs, as disclosed in FIG. 4 of JP Patent Publication-A-6-221368. The elastic partition membrane was constructed so that it can be situated in a spaced relation to the lattice members.

However, according to the conventional construction described above, strange sounds could be reduced to some degree, but collision sounds upon impingement of the elastic partition membrane on the ribs of the lattice members was inevitable, and hence, a problem existed in that it was not possible to reduce sufficiently strange sounds.

This invention has been made to solve the above-mentioned problem, and it is an object of the invention to provide a hydraulic antivibration device capable of reducing sufficiently strange sounds and an elastic partition membrane used for the hydraulic antivibration device.

DISCLOSURE OF THE INVENTION

In order to attain this object, the hydraulic antivibration device of a first invention comprises a first attachment fitting, a second attachment fitting in a cylindrical form, a vibration-isolating base connecting the second attachment fitting and the first attachment fitting to each other and made of a rubber-like elastomer, a diaphragm attached to the second attachment fitting to form a liquid-filled chamber between the diaphragm and the vibration-isolating base, a partition comparting the liquid-filled chamber into a first liquid chamber on the vibration-isolating base side and a second liquid chamber on the diaphragm side, and an orifice putting the first and second liquid chambers into communication with each other, the partition including an elastic partition membrane and a pair of lattice members regulating the displacement amount of the elastic partition membrane from both sides thereof. And the device is constructed so that the elastic partition membrane is provided on both faces thereof with rib groups projectingly, and the rib groups include a plurality of first ribs and a plurality of second ribs existing in a mutually intermingled fashion, wherein the first ribs are set in such a height dimension that tops of them are situated to be spaced apart from the lattice members and the second ribs are set in such a height dimension that tops of them abut on the lattice members and in a rib width smaller than the first ribs.

The hydraulic antivibration device of a second invention is directed to the hydraulic antivibration device of the first invention, wherein the aforesaid first ribs are disposed on the faces of the elastic partition membrane so as to be capable of surrounding lattice holes every a predetermined number of them and the aforesaid second ribs are disposed on the faces of the elastic partition membrane in a distributed manner.

The hydraulic antivibration device of a third invention is directed to the hydraulic antivibration device of the second invention, wherein the lattice holes are arranged in a plurality of rows in the circumferential direction of the lattice members, and the aforesaid first ribs are configured in an annular fashion so as to be capable of abutting on such portions of the lattice members that are located on radially both sides of each row of the lattice holes thereof whereas the aforesaid second ribs are arranged in a radial fashion relative to an axis center of the elastic partition membrane.

The hydraulic antivibration device of a fourth invention is directed to the hydraulic antivibration device of the first invention, wherein the aforesaid first and second ribs are arranged on the faces of the elastic partition membrane so that they can surround lattice holes every a predetermined number of them.

The hydraulic antivibration device of a fifth invention comprises a first attachment fitting, a second attachment fitting in a cylindrical form, a vibration-isolating base connecting the second attachment fitting and the first attachment fitting to each other and composed of a rubber-like elastomer, a diaphragm attached to the second attachment fitting to form a liquid-filled chamber between the diaphragm and the vibration-isolating base, a partition comparting the liquid-filled chamber into a first liquid chamber on the vibration-isolating base side and a second liquid chamber on the diaphragm side, and an orifice putting the first and second liquid chambers into communication with each other, the partition including an elastic partition membrane, a cylinder portion accommodating the elastic partition membrane, and a pair of lattice members regulating the displacement amount of the elastic partition membrane from both sides thereof, wherein the one lattice member of the aforesaid pair of lattice members is joined integrally with the cylinder portion between inner peripheral faces thereof, and the elastic partition membrane is provided on both faces thereof with a plurality of ribs capable of surrounding lattice holes every a predetermined number of them.

The hydraulic antivibration device of a sixth invention is directed to the hydraulic antivibration device of the fifth invention, wherein the elastic partition membrane is provided on both faces thereof with a plurality of auxiliary ribs arranged in a distributed manner, the aforesaid ribs are set in such a height dimension that tops of them are situated to be spaced apart from the lattice members, and the aforesaid auxiliary ribs are set in such a height dimension that tops of them abut on the lattice members and in rib width smaller than the ribs.

The hydraulic antivibration device of a seventh invention is directed to the hydraulic antivibration device of the sixth invention, wherein the aforesaid lattice holes are disposed in a plurality of rows in the circumferential direction of the lattice members, and the aforesaid plural ribs are configured in an annular fashion such that the ribs can abut on such portions of the lattice members that are situated on radially both sides of each row of the lattice holes and the aforesaid auxiliary ribs are arranged in a radial fashion relative to an axis center of the elastic partition membrane.

The hydraulic antivibration device of an eighth invention comprises a first attachment fitting, a second attachment fitting in a cylindrical form, a vibration-isolating base connecting the second attachment fitting and the first attachment fitting to each other and composed of a rubber-like elastomer, a diaphragm attached to the second attachment fitting to form a liquid-filled chamber between the diaphragm and the vibration-isolating base, a partition comparting the liquid-filled chamber into a first liquid chamber on the vibration-isolating base side and a second liquid chamber on the diaphragm side, and an orifice putting the first and second liquid chambers into communication with each other, the partition including an elastic partition membrane and a pair of lattice members regulating the displacement amount of the elastic partition membrane from both sides thereof, wherein the elastic partition membrane is provided on its one face side with first displacement-regulating protrusions and on its other face side or an opposing face of the lattice member thereto with second displacement-regulating protrusions projectingly, and the first displacement-regulating protrusions are arranged in an asymmetric position to the second displacement-regulating protrusions relative to a phantom (hypothetical) plane passing through a center of the elastic partition membrane in its thickness direction.

The hydraulic antivibration device of a ninth invention is directed to the hydraulic antivibration device of the eighth invention, wherein the second displacement-regulating protrusions are provided projectingly on the other face of the elastic partition membrane.

The hydraulic antivibration device of a tenth invention is directed to the hydraulic antivibration device of the eighth or the ninth invention, wherein at least part of the second displacement-regulating protrusions are disposed in plural number in a radial fashion relative to an axis center of the elastic partition membrane, and at least part of the first displacement-regulating protrusions are disposed in a radial fashion relative to an axis center of the elastic partition membrane in a nearly intermediate position between a pair of the second displacement-regulating protrusions disposed radially and adjacently.

The hydraulic antivibration device of an eleventh invention is directed to the hydraulic antivibration device of the ninth invention, wherein the first displacement-regulating protrusions and the second displacement protrusions, respectively in pieces of n, are disposed in a radial fashion relative to an axis center of the elastic partition membrane and substantially equidistantly in the circumferential direction so that the first displacement-regulating protrusions may be deviated in the circumferential direction to the second displacement-regulating protrusions by a rotation angle of about π/n, and the first displacement-regulating protrusions and the second displacement protrusions are configured in substantially the same protrusion height and substantially the same protrusion width.

In the eleventh invention, by the passage 'disposed in a radial fashion "relative to an axis center" of the elastic partition membrane' is meant that the respective displacement-regulating protrusions are disposed in a radial fashion "from the axis center toward outwardly", and the letter "n" stands for an integer of 1 or upwards. The symbol "π" stands for the ratio of circumference to diameter of a circle (ca. 3.14) and the unit of the "rotation angle of π/n" is rad (radian).

For example, an elastic partition membrane 115 (cf. FIG. 16) in the second embodiment, which will be described below, has first and second displacement-regulating protrusions 151$a$, 151$b$ respectively of four pieces (n=4) disposed nearly equidistantly (90 degree intervals) in the circumferential direction, wherein the first displacement-regulating protrusions 151$a$ are deviated circumferentially to the second displacement-regulating protrusions 151$b$ by a rotation angle of 45 degrees (=π/4 rad).

The hydraulic antivibration device of a twelfth invention is directed to the hydraulic antivibration device of any one of the eighth to the eleventh inventions, wherein the first displacement-regulating protrusions and the second displacement-regulating protrusions are configured in such a height that tops of them can abut on the lattice members or the elastic partition membrane.

The hydraulic antivibration device of a thirteenth invention is directed to the hydraulic antivibration device of any one of the eighth to the twelfth inventions, wherein the elastic partition membrane is further provided with auxiliary protrusions having a lower protrusion height and a narrower protrusion width than the first displacement-regulating protrusions.

The elastic partition membrane of a fourteenth invention is used for the hydraulic antivibration device of any one of the first to the thirteenth inventions.

BRIEF DESCRIPTION OF THE DRAWINGS

FIG. 16 ($a$) is a top plan view of an elastic partition membrane, FIG. 16 ($b$) is a side elevation of the elastic partition membrane, and FIG. 16 ($c$) is a bottom plan view of the elastic partition membrane.

FIG. 21 (a) is a plan view of Comparative Example 1, and FIG. 21 (b) is a plan view of Example 1.

Figure 1:
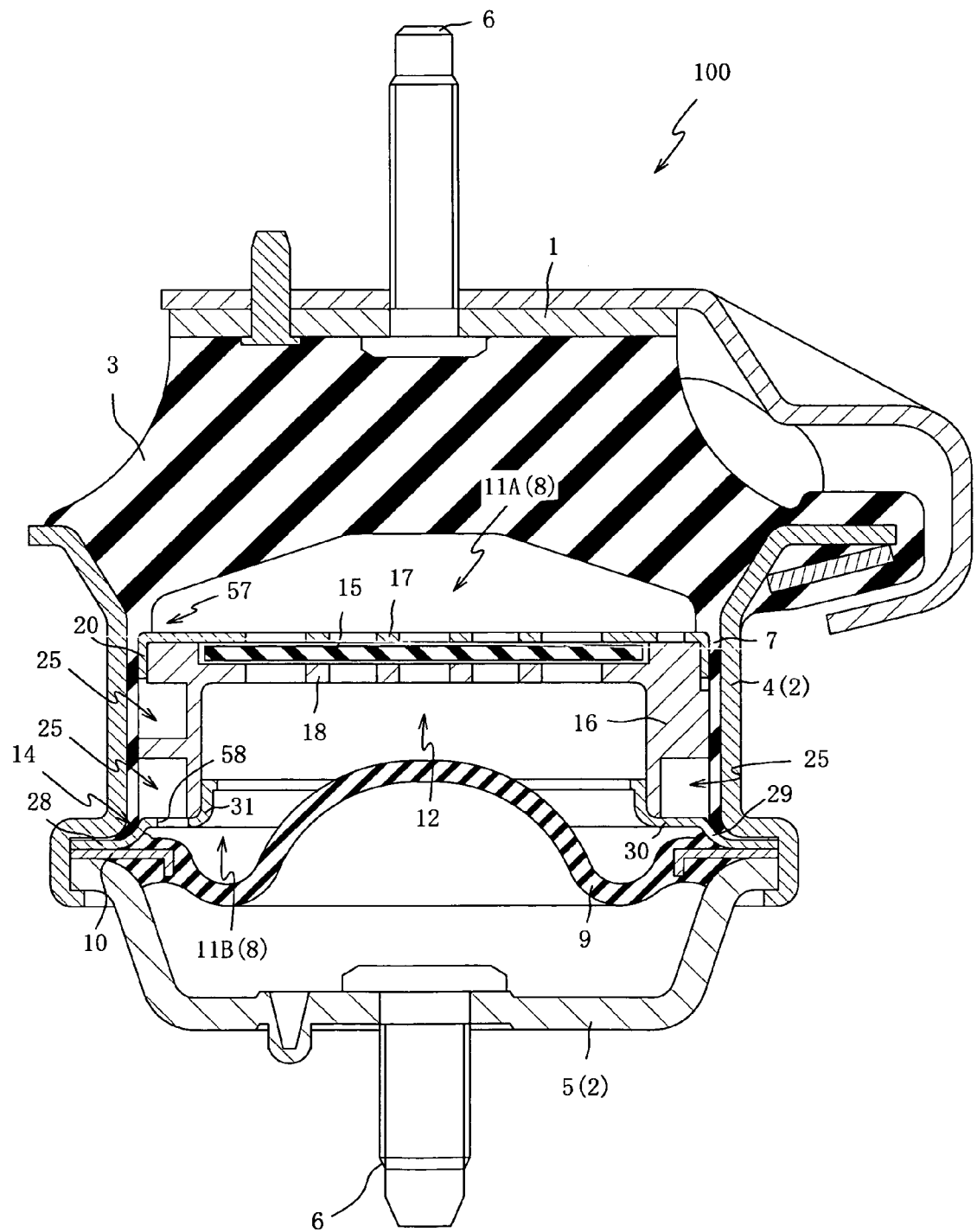
FIG. 1 is a longitudinal sectional view of a hydraulic antivibration device in a first embodiment of the invention.

DESCRIPTION OF REFERENCE CHARACTERS 100, 200 hydraulic antivibration device
1, 101 first attachment fitting (or first attachment fixture)
2, 102 second attachment fitting (or second attachment fixture)
3, 103 vibration-isolating base
8 liquid-filled chamber
9 diaphragm
11A first liquid chamber
11B second liquid chamber
12, 112 partition
16, 116 cylinder member (cylinder portion)
25, 125 orifice
15, 115 elastic partition membrane
17, 117 partition membrane displacement-regulating member (lattice member)
18, 118 lattice wall (lattice member)
50 rib group
51 first rib (rib)
52 second rib (auxiliary rib)
151a first displacement-regulating protrusion
151b second displacement-regulating protrusion
152a first auxiliary protrusion (auxiliary protrusion)
152b second auxiliary protrusion (auxiliary protrusion)
54, 154 lattice hole
54A~54C, 154A~154C lattice hole
P,T axis center of elastic partition membrane

BEST MODE FOR CARRYING OUT THE INVENTION

Preferred embodiments of the invention will be hereinafter described with reference to the accompanying drawings. In FIG. 1 the hydraulic antivibration device 100 in a first embodiment is illustrated.

The hydraulic antivibration device 100 is, as shown in FIG. 1, made up of the first attachment fitting 1 to be attached to an engine of automobiles, the second attachment fitting 2 in a cylindrical form to be attached to a vehicle body frame beneath the engine, and the vibration-isolating base 3 connecting these and composed of a rubber-like elastomer.

As illustrated in FIG. 1, the first attachment fitting 1 is fashioned in a plate form and provided at its central part with an upwardly orientated attachment bolt 6 in a projecting manner. The second attachment fitting 2 includes a cylindrical fitting 4, to which the vibration-isolating base 3 is vulcanization molded, and a cup-shaped bottom fitting 5 which is provided at its central part with a downwardly orientated attachment bolt 6 in a projecting manner.

The vibration-isolating base 3 is formed in a conical frustum shape. As shown in FIG. 1, the upper end face thereof is vulcanization bonded to the first attachment fitting 1, and the lower end part thereof is vulcanization bonded to an upwardly splaying upper end opening of the cylindrical fitting 4. At the underside of the vibration-isolating base 3, there is defined an upwardly narrowing hollow part, and at the lower end of the vibration-isolating base 3, a rubber membrane 7 covering the inner peripheral face of the cylindrical fitting 4 joins.

At the second attachment fitting 2, the diaphragm 9 fashioned in a partially spherical form from a rubber membrane is attached as shown in FIG. 1, and between the diaphragm 9 and the underside of the vibration-isolating base 3, the liquid-filled chamber 8 is formed. The liquid-filled chamber 8 is sealed with liquid. The diaphragm 9 is covered with the bottom fitting 5.

As illustrated in FIG. 1, the liquid-filled chamber 8 is comparted by the partition 12 (cf. FIGS. 10 and 11) into the first liquid chamber 11A on the vibration-isolating base 3 side and the second liquid chamber 11B on the diaphragm 9 side. The partition 12 is pinched and held in place by a pinching member 14 provided on the inner periphery side of the second attachment fitting 2 and the vibration-isolating base 3.

The partition 12 is made up of the elastic partition membrane 15 configured in a disc shape from a rubber membrane, the cylinder member 16 accommodating the elastic partition membrane 15 to receive it with the lattice wall 18 on the inner periphery side thereof, and the partition membrane displacement-regulating member 17 in a lattice disc shape covering the opening of the cylinder member 16 at its one end (upper side in FIG. 1). That is, the lattice wall 18 and the partition membrane displacement-regulating member 17 serve to regulate the displacement amount of the elastic partition membrane 15 from both sides thereof.

Figure 2:
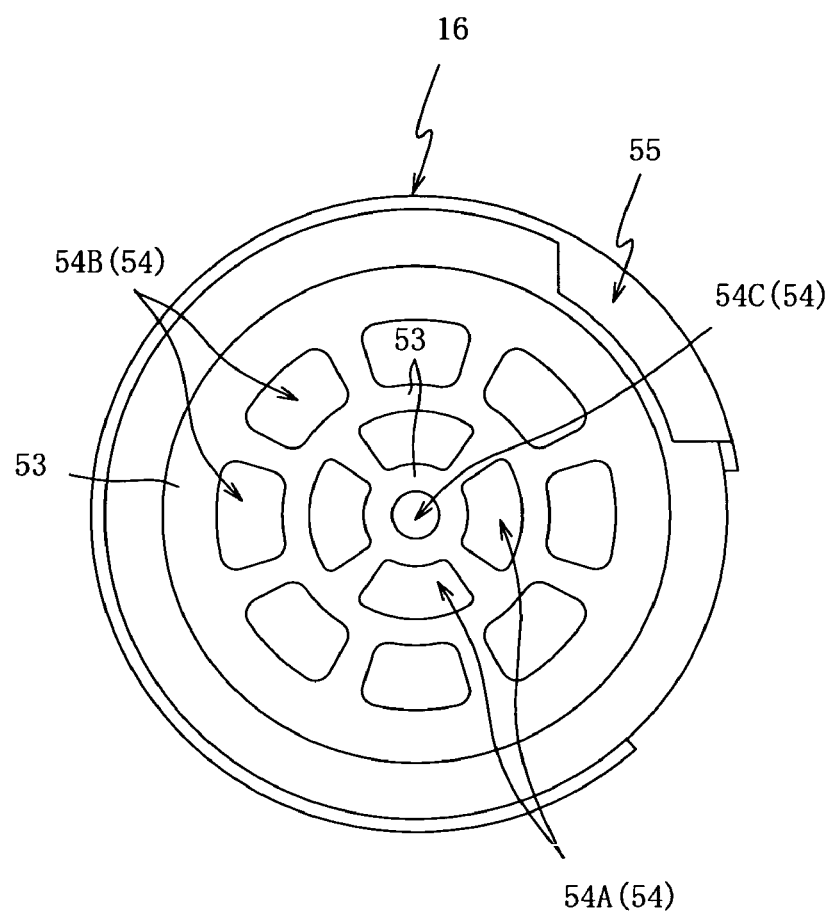
FIG. 2 is a plan view of a cylinder member.
Figure 3:
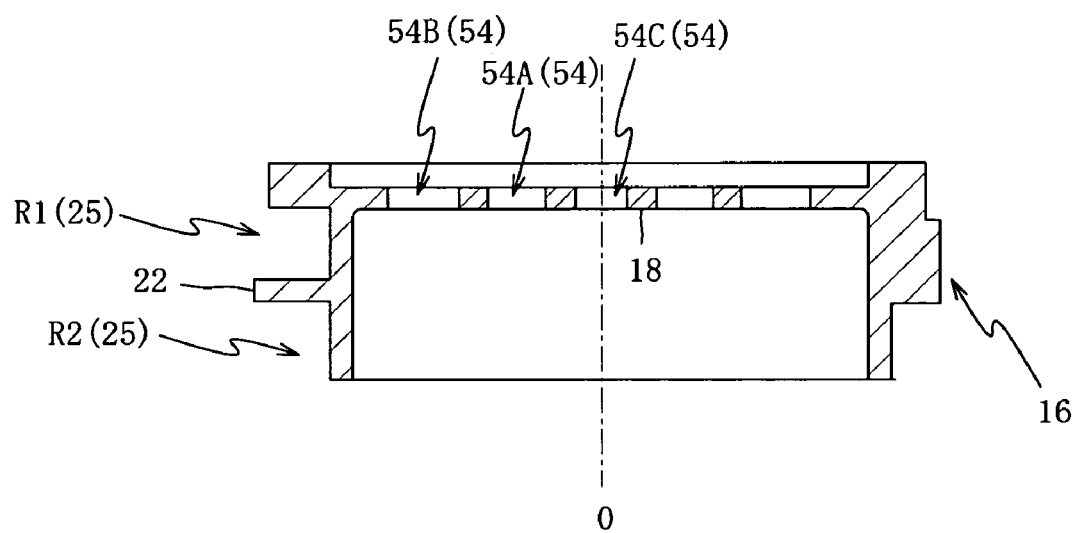
FIG. 3 is a front elevational view in longitudinal cross-section of the cylinder member.
Figure 4:
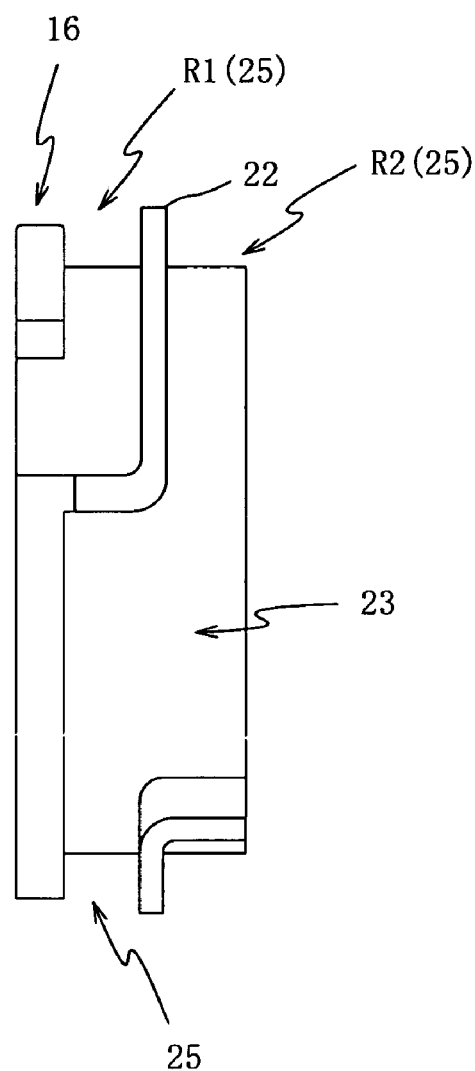
FIG. 4 is a side elevational view of the cylinder member.

Between the outer peripheral face of the cylinder member 16 and the inner peripheral face of the second attachment fitting 2, the orifice 25 is formed. Here, referring to FIGS. 2 to 4, a description is made of the orifice 25. The orifice 25 is an orifice passage for putting the first liquid chamber 11A and the second liquid chamber 11B into communication with each other (cf. FIG. 1) and makes two rounds about an axis center O of the cylinder member 16 as shown in FIGS. 2 to 4.

Stated another way, the orifice 25 consists of an orifice passage R1 constituting an upper one round and an orifice passage R2 constituting a lower one round. The upper and lower orifice passages R1, R2 are partitioned by an orifice-forming wall 22. The upper orifice passage R1 communicates through an opening 19 (cf. FIG. 5) of the partition membrane displacement-regulating member 17 and a cutout 55 with the first liquid chamber 11A. The lower orifice passage R2 communicates through an opening 58 (cf. FIG. 1) of the pinching member 14 with the second liquid chamber 11B.

Returning to FIG. 1, the pinching member 14 is made up of a flat plate portion 28 on its outer periphery side, a first cylinder portion 29 infixing in the lower end of the rubber membrane 7, a flat plate portion 30 on its intermediate portion side forcing on the other end of the cylinder member 16, and a second cylinder portion 31 infixing in an opening of the cylinder member 16 on its other end side (lower side in FIG. 1). The flat plate portion 28 on the outer periphery side is fixed by crimping together with an attachment plate 10 of the diaphragm 9 and the bottom fitting 5 by turning up the lower end of the cylindrical fitting 4.

Figure 5:
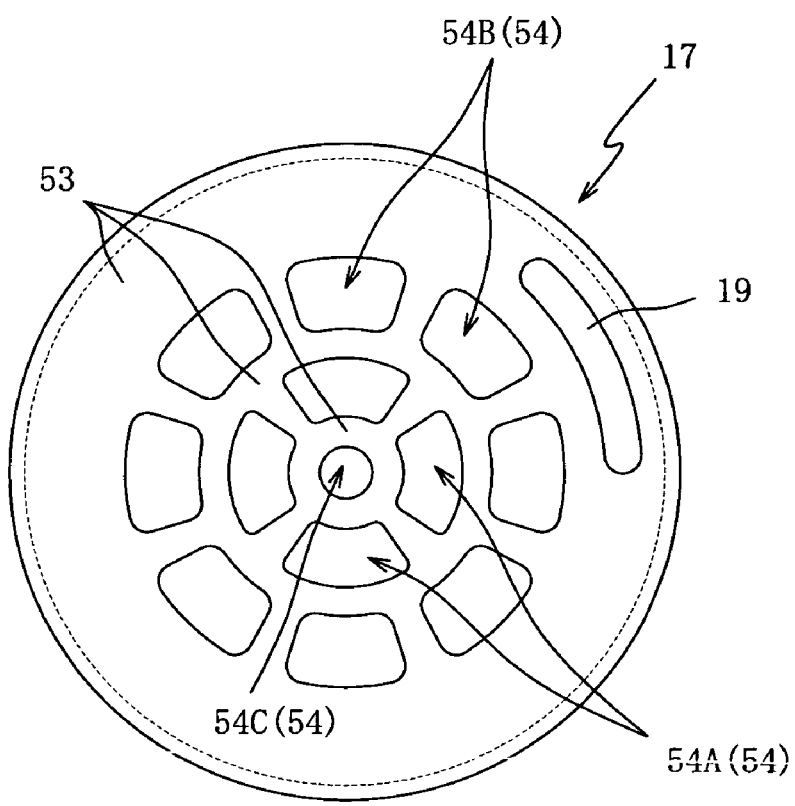
FIG. 5 is a plan view of a partition membrane displacement-regulating member (a partition membrane's displacement-regulating member).
Figure 6:
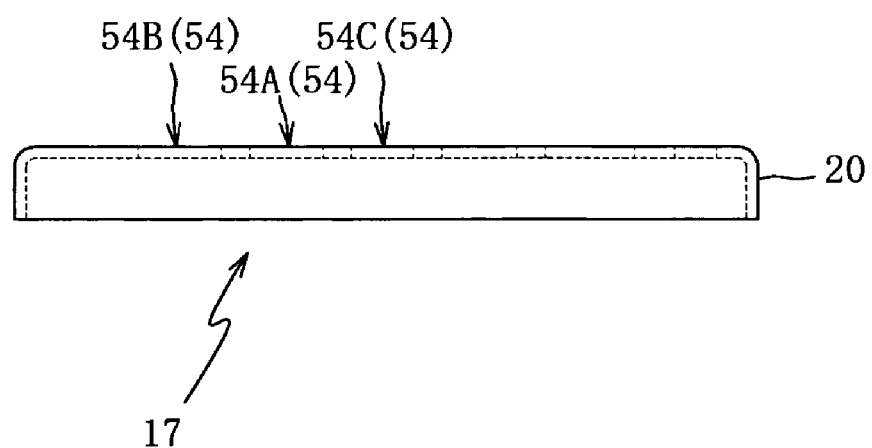
FIG. 6 is a front elevational view of the partition membrane displacement-regulating member.

The partition membrane displacement-regulating member 17 will be described with reference to FIGS. 5 and 6. The partition membrane displacement-regulating member 17 as shown in FIGS. 5 and 6 is provided on its outer periphery side with a cylinder portion 20, which is in turn externally fitted on one end of the cylinder member 16 (cf. FIG. 1). And an upper end of the partition membrane displacement-regulating member 17 is received on a step 57 of the vibration-isolating base 3 in the axis center direction of the cylinder member 16 (cf. FIG. 1).

The lattice holes 54 of the partition membrane displacement-regulating member 17 are comprised of, as shown in FIGS. 5 and 6, the lattice hole 54C on the central side, and the lattice holes 54A, 54B arranged in two rows in the circumferential direction of the partition membrane displacement-regulating member 17.

The number of the lattice holes 54A in the inner row is four while the number of the lattice holes 54B in the outer row is eight. As shown in FIG. 5, they are arranged at intervals of respective equal angles (90 degrees or 45 degrees). And besides, the inner row of the lattice holes 54A are adapted in circumferential position to the outer row of the lattice holes 54B located every 45 degrees.

The configuration of the lattice hole rows is as depicted in FIG. 5 such that circumferentially extending annular holes are divided in a radial way. As mentioned above, the opening 19 is an aperture bringing the first liquid chamber 11A and the orifice 25 into communication with each other.

The lattice holes 54 of the lattice wall 18 also comprise the central lattice hole 54C, and the lattice holes 54A, 54B arranged in two rows in the circumferential direction of the lattice wall 18 (cf. FIGS. 2 to 4). The pattern (number, shape, position about the axis center O of the lattice wall 18, etc.) of them is identical to that on the partition membrane displacement-regulating member 17 side.

Figure 10:
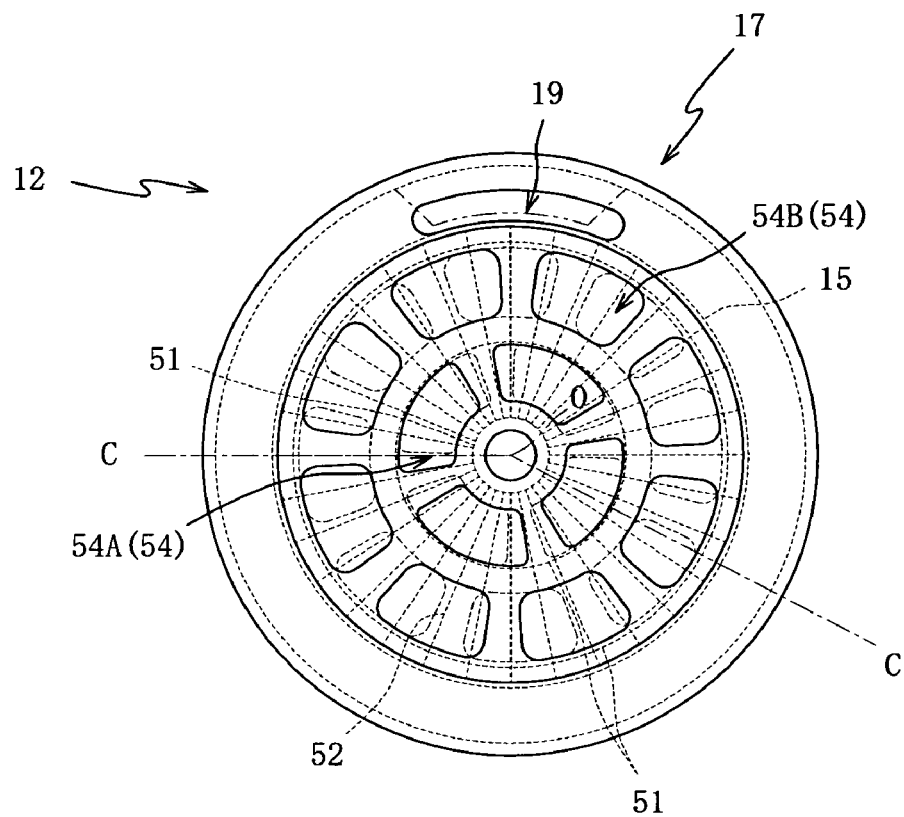
FIG. 10 is a plan view of a partition.

However, the cylinder portion 20 of the partition membrane displacement-regulating member 17 is externally fitted on the cylinder member 16 so that the lattice holes 54A, 54B of the lattice wall 18 may be deviated in position in the circumferential direction from the lattice holes 54A, 54B of the partition membrane displacement-regulating member 17 (cf. FIG. 10). The positions of both the central lattice holes 54C are the same.

Figure 7:
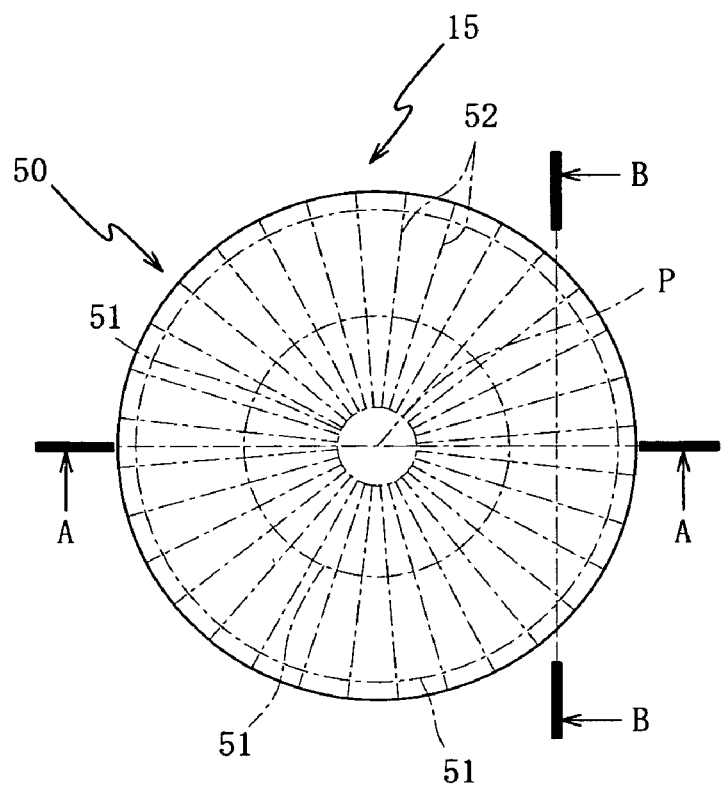
FIG. 7 is a plan view of an elastic partition membrane.
Figure 8:
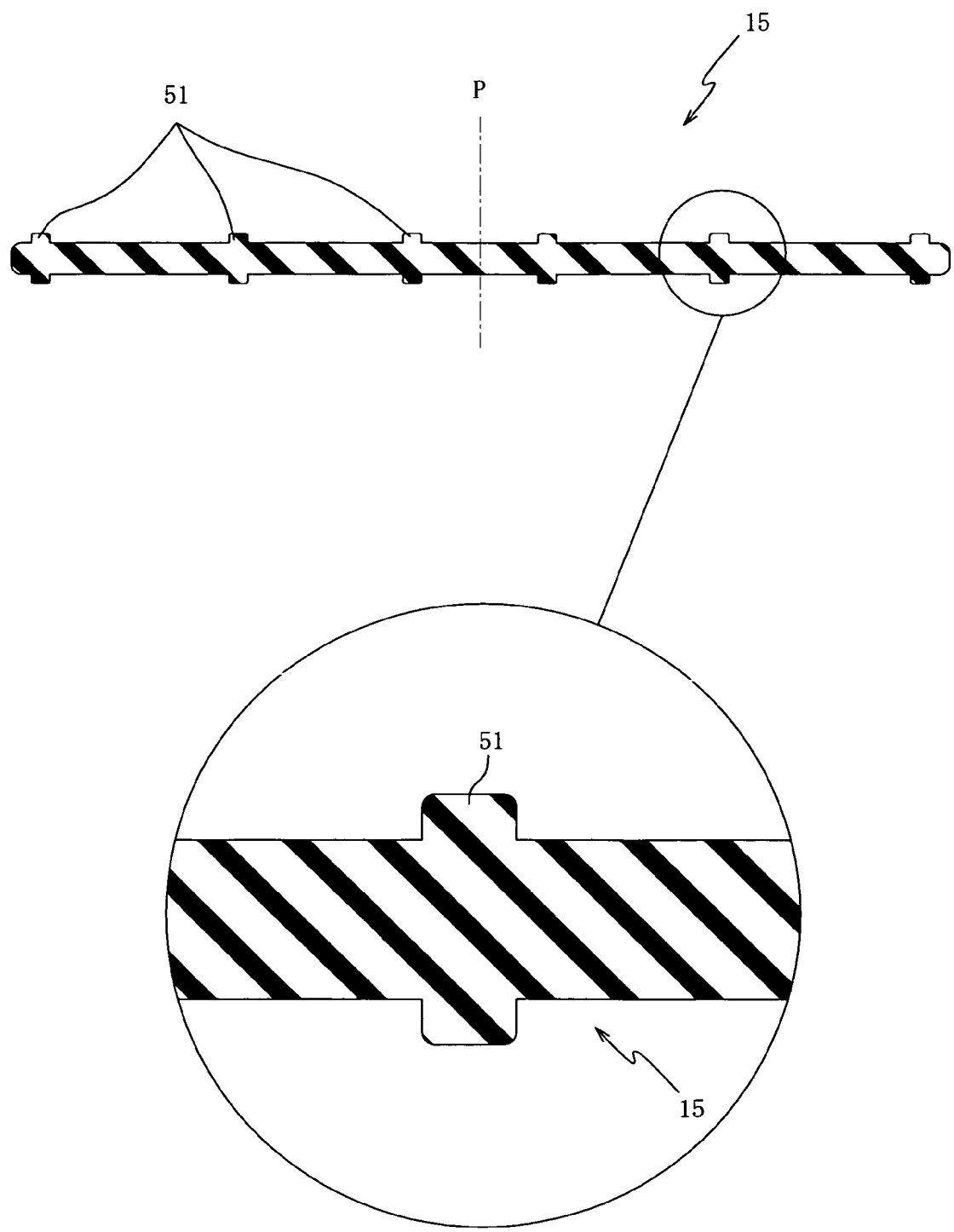
FIG. 8 is a cross-sectional view taken along A-A line in FIG. 7.
Figure 9:
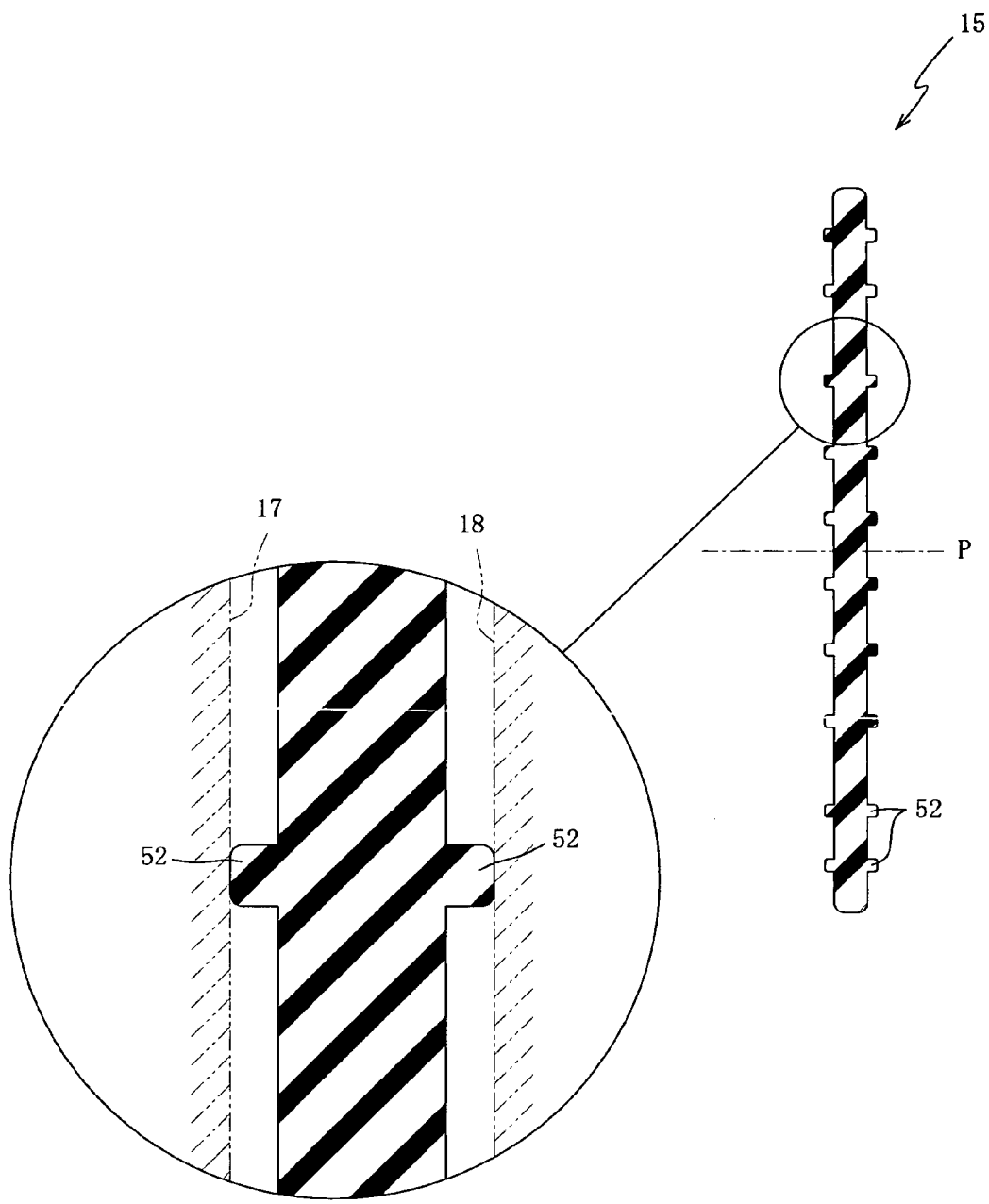
FIG. 9 is a sectional view taken along B-B line in FIG. 7.

Now the elastic partition membrane 15 will be described with reference to FIGS. 7 to 9. The partition membrane 15 is, as shown in FIGS. 7 to 9, provided on its both faces with the rib groups 50 in a projecting manner. The pattern of the rib group 50 on the one face and the pattern of the rib group 50 on the other face are the same.

The rib groups 50 each consist of a plurality of the first ribs 51 and a plurality of the second ribs 52.

Figure 11:
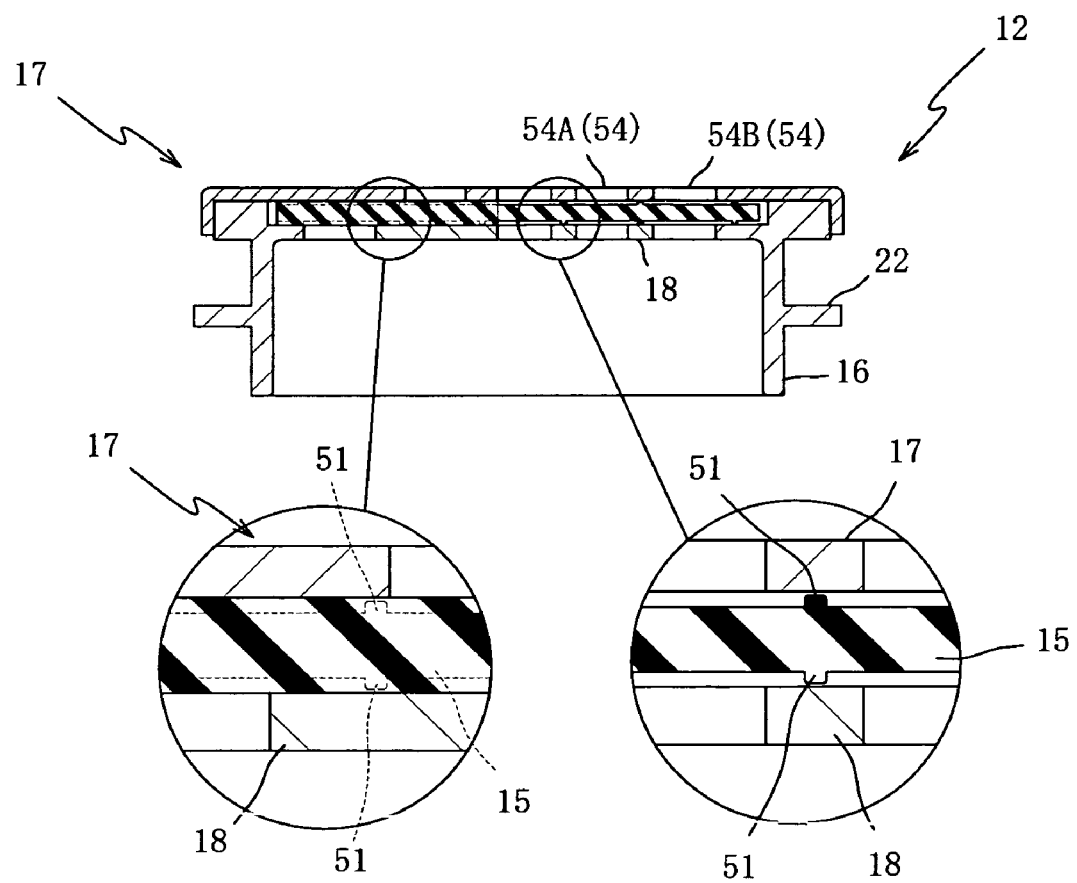
FIG. 11 is a sectional view taken on C-O-C line in FIG. 10.

As shown in FIG. 7, a plurality of the first ribs 51 are configured in an annular fashion relative to the axis center P of the elastic partition membrane 15 and set in height dimension so that tops of them may be spaced apart from the lattice wall 18 (or the partition membrane displacement-regulating member 17) (cf. FIG. 11). That is, in a stationary state where no hydraulic pressure acts, a clearance of a predetermined dimension is formed between the tops of the first ribs 51 and the lattice wall 18 (or the partition membrane displacement-regulating member 17).

By the passage recited in claim 1 or claim 6 that "the tops of the first ribs are situated to be spaced apart from the lattice member" is meant that the height dimension of the first ribs is set to have the aforesaid clearance in the aforesaid stationary state. Therefore, it is not required also when a hydraulic pressure acts to displace the elastic partition membrane that "the tops of the first ribs are situated to be spaced apart from the lattice member".

A plurality of the first ribs 51 are constructed to be capable of abutting on lattice member portions 53 (cf. FIGS. 2 and 5) on radially both sides of the respective lattice hole rows of the lattice wall 18 (or the partition membrane displacement-regulating member 17) when a hydraulic pressure acts and the elastic partition membrane 15 is displaced. Thereby a plurality of the first ribs 51 surround the lattice holes 54 every each of the rows (the inner row, outer row).

By the passage recited in claim 2 or claim 5 that "the first ribs are disposed to be capable of surrounding lattice holes" is meant that as described above, when the first ribs 51 abut on the lattice member portions 53, the first ribs 51 surround the lattice holes 54. Because of that, it is not required also in the stationary state that no hydraulic pressure acts that "the lattice holes are surrounded by the first ribs".

The second ribs 52 are disposed over the whole surface of the elastic partition membrane 15 in a distributed manner. More particularly, as shown in FIG. 7, they are arranged in a radial fashion relative to the axis center P of the elastic partition membrane 15.

And the second ribs 52 are set in height dimension so that tops of them may abut on the lattice wall 18 (or the partition membrane displacement-regulating member 17) and in a rib width smaller than the first ribs 51.

As illustrated in FIG. 9 on an enlarged scale, in the assembled state, the tops of the second ribs 52 on the one face of the elastic partition membrane 15 are made to abut on the partition membrane displacement-regulating member 17 and the tops of the second ribs 52 on the other face are made to abut on the lattice wall 18.

As stated above, a plurality of the first ribs 51 and a plurality of the second ribs 52 exist in a mutually mingled state.

This invention has been described so far on the basis of the first embodiment, but is not limited to the first embodiment and it will be readily appreciated that various improvements or modifications are possible within the purview of the invention without departing from the spirit of the invention.

[1] In the first embodiment above, a plurality of the first ribs 51 are constructed to be capable of surrounding the lattice holes 54 every plural lattice holes, but may be constructed to be capable of surrounding the lattice holes 54 every one lattice hole.

That is, the rib groups 50 may comprise a plurality of the first ribs 51 capable of surrounding the lattice holes 54 every one lattice hole and a plurality of the second ribs 52 disposed on either face of the elastic partition membrane 15 in a distributed manner. Here, the pattern of the second ribs 52 may be other pattern than a radial pattern, as further stated in [4] below.

[2] In the first embodiment, it is only the first ribs 51 of the elastic partition membrane 15 that surround a predetermined number of the lattice holes 54. However instead of that, for example, such a configuration is also possible that a predetermined number (one or plural) of the lattice holes 54 are surrounded each with a quadrilateral frame-shaped rib consisting of the first ribs 51 and the second ribs 52. In this case, it is also possible to set the lateral two sides of the quadrilateral frame for the first ribs 51 and the longitudinal two sides for the second ribs 52.

[3] This invention is also applicable to the case where the first ribs 51 and the second ribs 52 do not surround the lattice holes 54.

[4] The invention is not limited to the pattern of the lattice holes 54 and the patterns of the first ribs 52 and the second ribs 52 as described in the first embodiment, but it is naturally possible to apply another patterns of them to the invention.

Now the description will be given of a second embodiment of the invention with reference to FIGS. 12 through 23. In the first embodiment, the rib groups 50 are disposed symmetrically on both faces of the elastic partition membrane 15, whereas in the second embodiment, the first and the second displacement-regulating protrusions 151a, 151b are disposed asymmetrically relative to a phantom plane F passing through the center of the elastic partition membrane 115 in the thickness direction. The parts similar to those in the first example described above are designated by like reference characters, and the description of them is omitted, accordingly.

Figure 12:
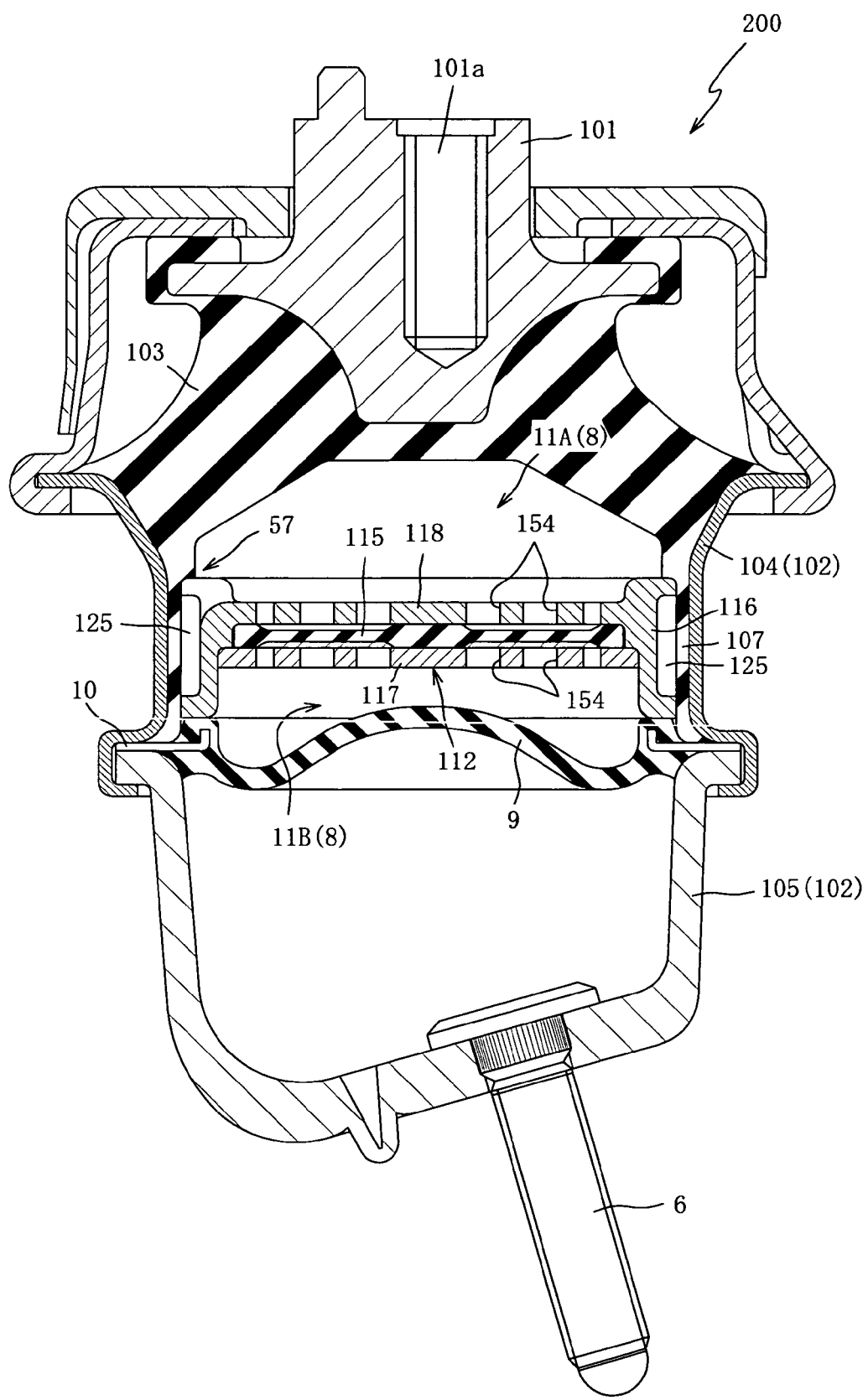
FIG. 12 is a longitudinal sectional view of a hydraulic antivibration device in a second embodiment of the invention.

FIG. 12 is a longitudinal sectional view of the hydraulic antivibration device 200 in the second embodiment. The hydraulic antivibration device 200 is likewise as in the first embodiment made up of the first attachment fitting 101 to be attached to the engine side of automobiles, the second attachment fitting 102 in a cylinder form to be attached to the vehicle body frame beneath the engine, and the vibration-isolating base 103 connecting the first and second attachment fittings 101, 102 together and composed of a rubber-like elastomer.

The first attachment fitting 101 is formed in a columnar shape and as shown in FIG. 12, bored at its upper end face with a female portion 101a. The second attachment fitting 102 includes, as is the case with the first embodiment, a cylindrical fitting 104 to which the vibration-isolating base 103 is vulcanization molded, and the cup-shaped bottom fitting 105. The bottom fitting 105 is slanted at its bottom part.

The vibration-isolating base 3 is configured in a conical frustum shape as in the first embodiment and vulcanization bonded between the first attachment fitting 101 and the cylinder fitting 104. The vibration-isolating base 3 is joined at its lower end to a rubber membrane 107 covering the inner peripheral face of the cylindrical fitting 104.

The second attachment fitting 102 is, as is the case with the first embodiment, attached with the diaphragm 9, between which and the underside of the vibration-isolating base 103 there is formed the liquid-filled chamber 8. The liquid-filled chamber 8 is divided by the partition 112 between the first liquid chamber 11A on the vibration-isolating base 103 side and the second liquid chamber 11B on the diaphragm 9 side.

As for the diaphragm 9, its attachment plate 10 is fixed by crimping to the second attachment fitting 102, and the partition 112 is pinched and held in place between the diaphragm 9 and the step 57 of the vibration-isolating base 103.

The partition 112 is made up of the elastic partition membrane 115 fashioned in a disc shape from a rubber membrane, the cylinder member 116 accommodating the elastic partition membrane 115 to receive it on the lattice wall 118 on the inner peripheral face side, and the partition membrane displacement-regulating member 117 in a lattice disc shape infixed in the opening at the lower side (lower side in FIG. 12) of the cylinder member 116.

Thus the lattice wall 118 and the partition membrane displacement-regulating member 117 are disposed to be spaced apart a predetermined distance from each other in a mutually opposing manner, whereby the displacement amount of the elastic partition membrane 115 is regulated from both upper and lower sides, as is the case with the first embodiment.

Between the outer peripheral face of the cylinder member 116 and the rubber membrane 107 covering the inner peripheral face of the second attachment fitting 102, the orifice 125 for bringing the first liquid chamber 11A and the second liquid chamber 11B into communication with each other is formed so as to make one round about the axis center O of the cylinder member 116.

In the second embodiment, the outer periphery of the elastic partition membrane 115 is pinched and held between the lattice wall 118 and the partition membrane displacement-regulating member 117 without clearance, so that communication between the first liquid chamber 11A and the second liquid chamber 11B through the lattice holes 154, which will be described below, is completely shut out. Consequently, the liquid within the liquid-filled chamber 8 flows only through the orifice 125 between the first liquid chamber 12A and the second liquid chamber 11B.

Figure 13:
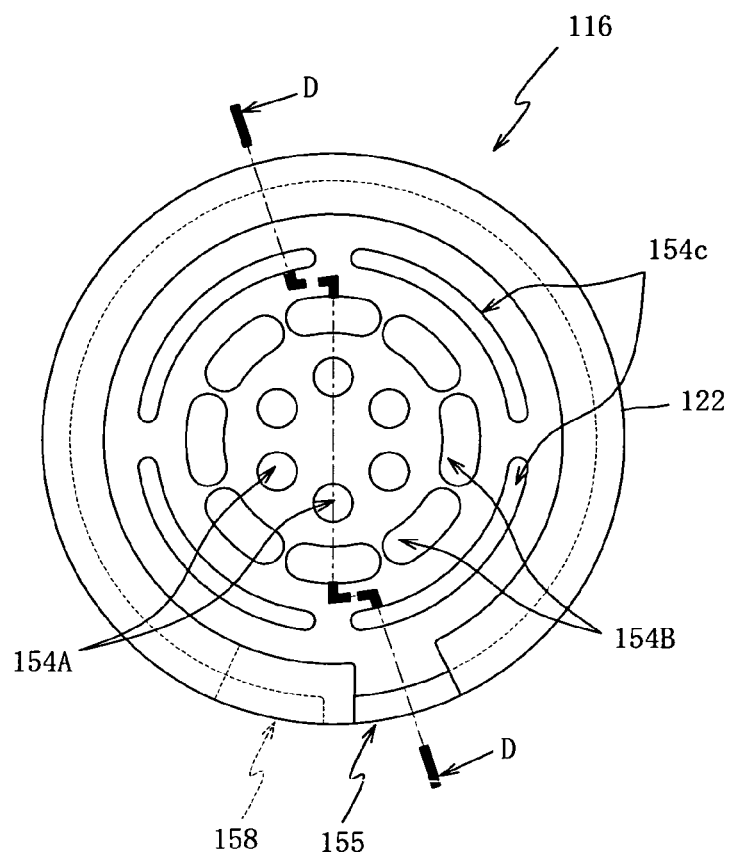
FIG. 13 ($a$) is a plan view of a cylinder member and FIG. 13 ($b$) is a side elevation of the cylinder member.
Figure 13:
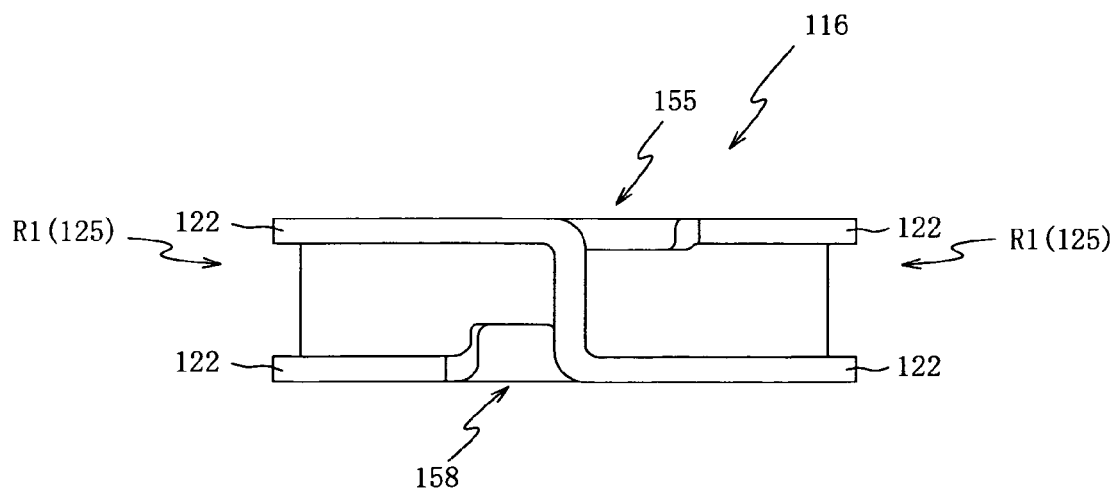
Figure 14:
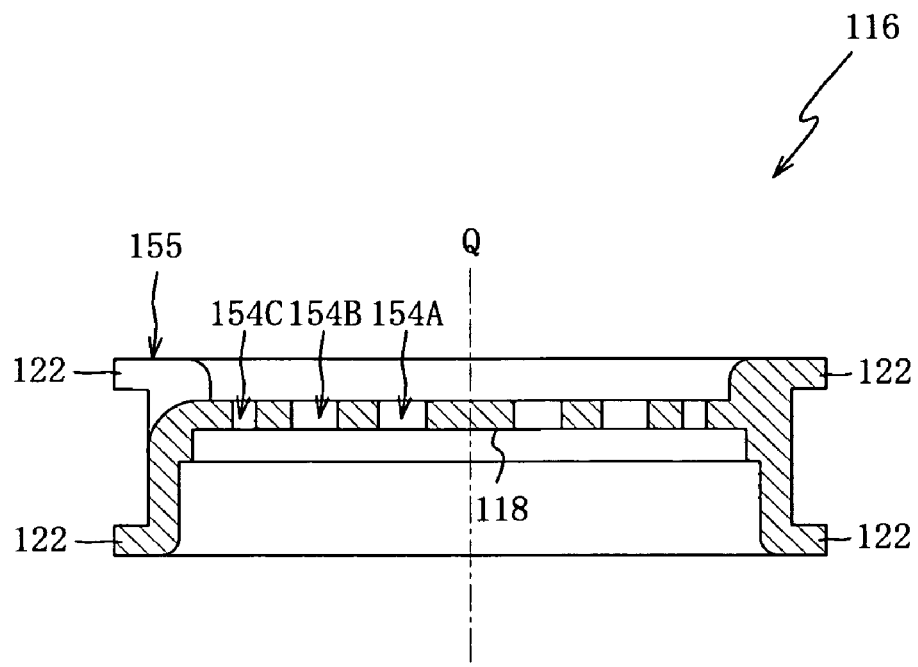
FIG. 14 is a sectional view taken on D-D line in FIG. 13.

The following description is made of the cylinder member 116 constituting the partition 112 with reference to FIGS. 13 and 14.

The cylinder member 116 is, as illustrated in FIGS. 13 and 14, configured in a cylinder shape having an axis center Q. The cylinder member 116 is provided at its axially upper and lower ends with orifice-forming walls 122 projecting in a nearly flange-like form, and between opposing faces of the orifice-forming walls 122 there is formed the orifice passage R1.

The upper and lower orifice-forming walls 122 are formed with cutouts 155, 158, respectively, and the orifice passage R1 communicates through the cutout 155 with the first liquid chamber 11A and through the cutout 158 with the second liquid chamber 11B.

On the inner periphery side of the cylinder member 116, as shown in FIGS. 13 and 14, there is formed the lattice wall 118, which is pierced with the lattice holes 154. The lattice holes 154 are of three rows of lattice holes 154A to 154C juxtaposed in the circumferential direction.

As illustrated in FIG. 13, the number of the respective lattice holes 154A to 154C is six in the inner row (lattice holes 154A), eight in the intermediate row (lattice holes 154B) and four in the outer row (lattice holes 154C), and the respective lattice holes 154A to 154C are disposed equiangularly (at intervals of 60 degrees, 45 degrees, and 90 degrees in turn from the inner row) in the circumferential direction.

The configurations of the respective lattice hole rows are as shown in FIG. 13 such that the inner row is of circular lattice holes 154A arranged in the circumferential direction, and the intermediate and outer rows are of respective radially divided annular holes circumferentially extending. The width of the lattice holes 154B is made substantially the same as the diameter of the lattice holes 154A and wider than that of the lattice holes 154C.

Figure 15:
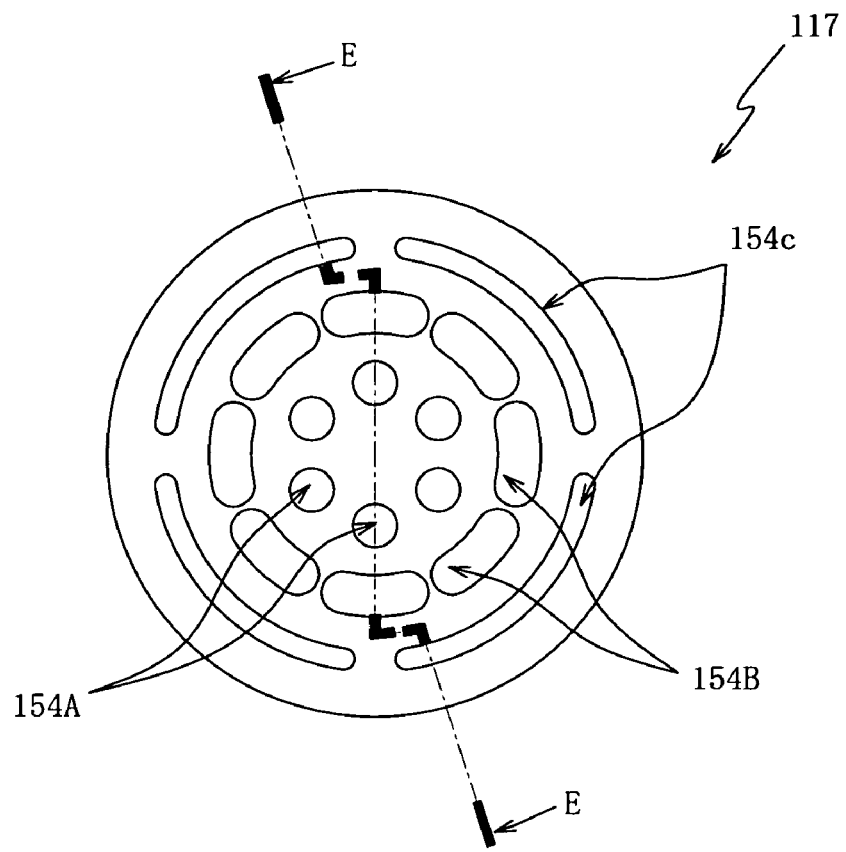
FIG. 15 ($a$) is a plan view of a partition membrane displacement-regulating member and FIG. 15 ($b$) is a sectional view taken on E-E line in FIG. 15 ($a$).
Figure 15:
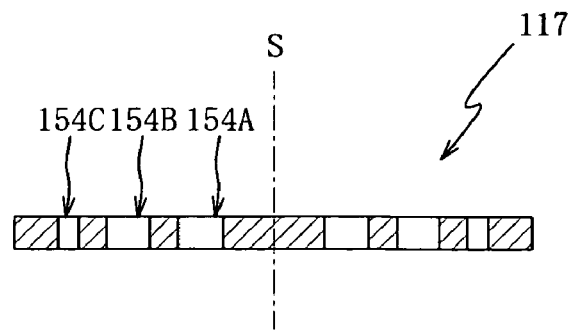

Referring to FIG. 15, the partition membrane displacement-regulating member 117 constituting the partition 112 will be described.

The partition membrane displacement-regulating member 117 is configured, as shown in FIGS. 15 (a) and (b), in a disc shape having an axis center S. The partition 112 is assembled by infixing the partition membrane displacement-regulating member 117 in the cylinder member 116 on its inner periphery side (cf. FIG. 12). Here, the positioning of the partition membrane displacement-regulating member 117 is conducted by engaging the upper extremity of the partition membrane displacement-regulating member 117 with a step (cf. FIG. 14) of the cylinder member 116 formed on its inner periphery side.

The partition membrane displacement-regulating member 117 is, as shown in FIG. 15, configured to have three rows of the lattice holes 154A through 154C juxtaposed in the circumferential direction. The pattern of these lattice holes 154A~154C (number, shape, position around the axis center S, etc.) is the same as that of the lattice wall 118, and the description of them is omitted, accordingly.

In the assembled state of the partition 112 (cf. FIG. 12), the positional relation of the partition membrane displacement-regulating member 117 to the lattice wall 118 is not particularly limited. That is, the circumferential positions of the respective lattice holes 154A~154C of the partition membrane displacement-regulating member 117 may be circumferentially deviated to the respective lattice holes 154A~154C of the lattice wall 118 or may coincide circumferentially with them.

Now the elastic partition membrane 115 will be described with reference to FIGS. 16 and 17.

Figure 17:
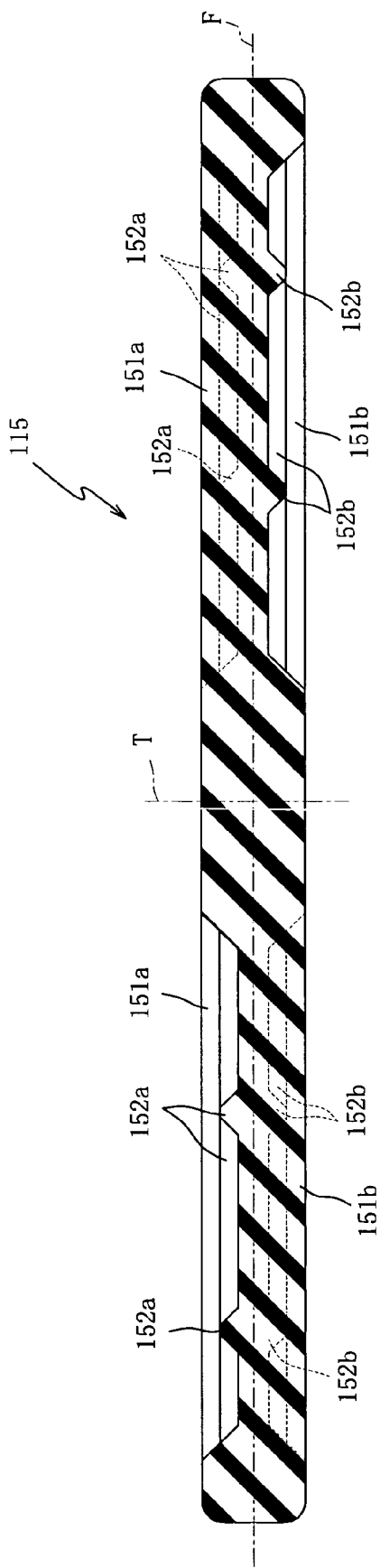
FIG. 17 is a sectional view taken on F-F line in FIG. 16 ($a$).

The elastic partition membrane 115 is provided, as shown in FIGS. 16 and 17, with the first displacement-regulating protrusions 151a and the first auxiliary protrusions 152a projecting from its one face side and the second displacement-regulating protrusions 151b and the second auxiliary protrusions 152b projecting from the other face side.

The first and the second displacement-regulating protrusions 151a, 151b are rib-like protrusions configured to have mutually the same protrusion height and protrusion width, and as shown in FIG. 16, four pieces each of the former and the latter are provided to extend in a radial rectilinear fashion from the axis center T of the elastic partition membrane 115 toward outwardly.

These first and second displacement-regulating protrusions 151a, 151b are disposed equidistantly (intervals of 90 degrees) in the circumferential direction as depicted in FIG. 16, and the first displacement-regulating protrusions 151a on the one face side are arranged to deviate relative to the second displacement-regulating protrusions 151b on the other face side by a predetermined rotation angle in the circumferential direction. Therefore the first displacement-regulating protrusions 151a are arranged in an asymmetric position to the second displacement-regulating protrusions 151b relative to the phantom plane F.

Here, by the phantom plane F is meant an imaginary plane that passes through a center in the thickness direction of the elastic partition membrane 115 (a membrane part provided with the respective displacement-regulating and auxiliary protrusions 151a, 151b, 152a, 152b) and is orthogonal to the axis line T of the elastic partition membrane 115.

For instance, in this second embodiment, since the first and second displacement-regulating protrusions 151a, 151b are configured in the same protrusion height, the phantom plane F in a cross-sectional shape including the axis line T (FIG. 17) is parallel to both a plane linking the tops of the first displacement-regulating protrusions 151a and a plane linking the tops of the second displacement-regulating protrusions 151b.

Here, the rotation angle at which the first displacement-regulating protrusions 151a on the one face side are deviated circumferentally to the second displacement-regulating protrusions 151b on the other face side is set at 45 degrees. As a consequence, the first displacement-regulating protrusions 151a (or the second displacement-regulating protrusions 151b), when viewed in the plane of the elastic partition membrane 115 shown in FIG. 16 (a) or (c), are disposed each in the intermediate position between a pair of mutually adjacent second displacement-regulating protrusions 151b (or the displacement-regulating protrusions 151a).

Further, the protrusion heights of the first and the second displacement-regulating protrusions 151a, 151b are constructed to be substantially the same as the height of the outer periphery of the elastic partition membrane 115 as shown in FIG. 17. Thus in the assembled state of the partition 112 (cf. FIG. 12), the tops of the first and second displacement-regulating protrusions 151a, 151b are made to abut on the partition membrane displacement-regulating member 117 or the lattice wall 118.

On the other hand, the fist and the second auxiliary protrusions 152a, 152b are rib-like protrusions having mutually the same protrusion height and protrusion width, and configured, as shown in FIG. 16, by a combination of radial parts and annular parts relative to the axis center T of the elastic partition membrane 115.

Further, the first and the second auxiliary protrusions 152a, 152b are set smaller in protrusion width than the first and second displacement-regulating protrusions 151a, 151b as shown in FIG. 16 and lower in protrusion height than the first and second displacement-regulating protrusions 151a, 151b as shown in FIG. 17.

The following description will be given of evaluation test results of strange sounds referring to FIG. 18 through FIG. 20.

The evaluation test of strange sounds means a test measuring strange sounds generated when a relatively large amplitude vibration such as cranking vibration is input. The measurement of strange sounds was conducted using the hydraulic antivibration device 200 in the second embodiment by varying the shape of the elastic partition membrane 115.

Figure 18:
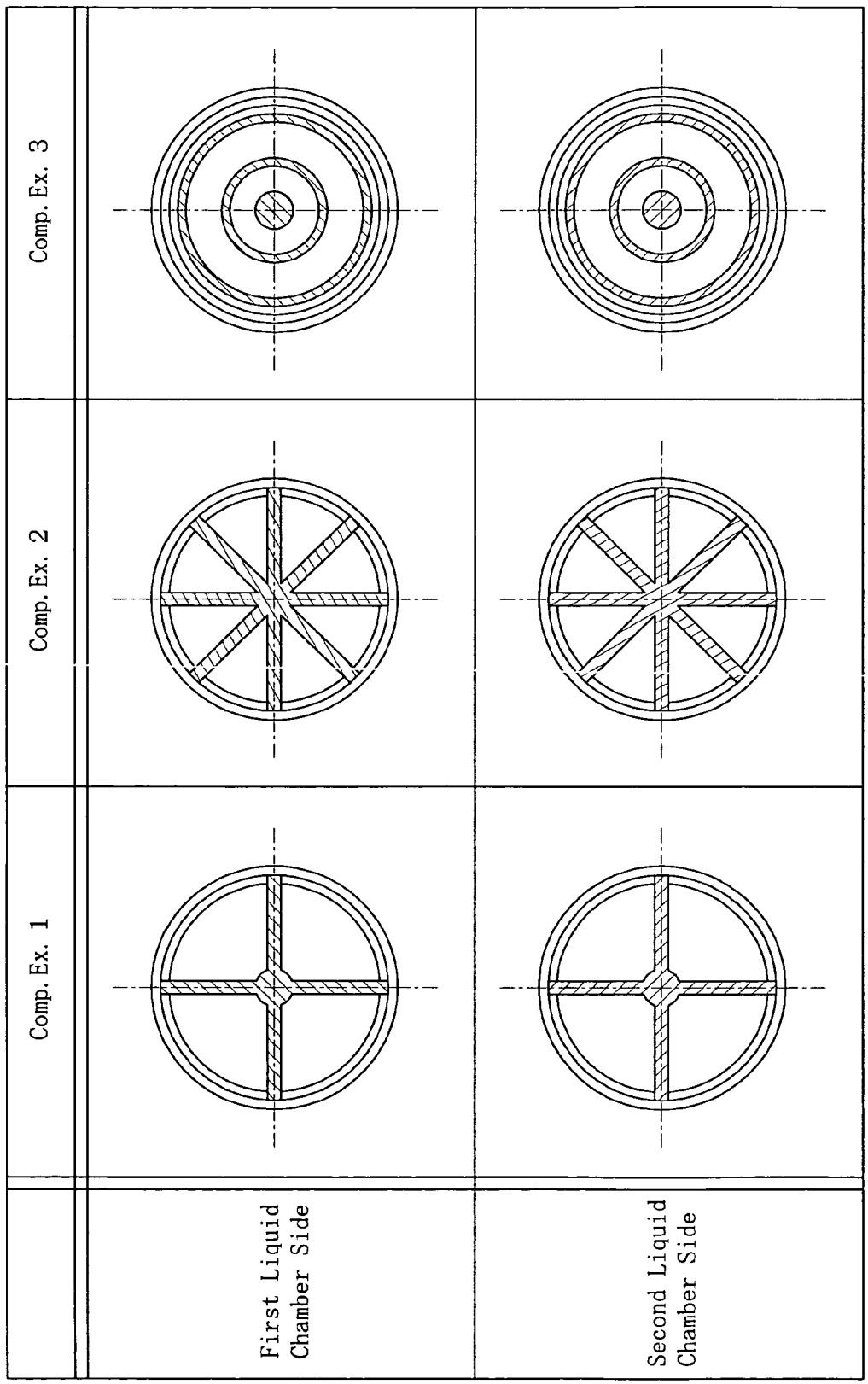
FIG. 18 is an illustrative representation of Comparative Examples 1 to 3 showing respective top planes and bottom planes of them.
Figure 19:
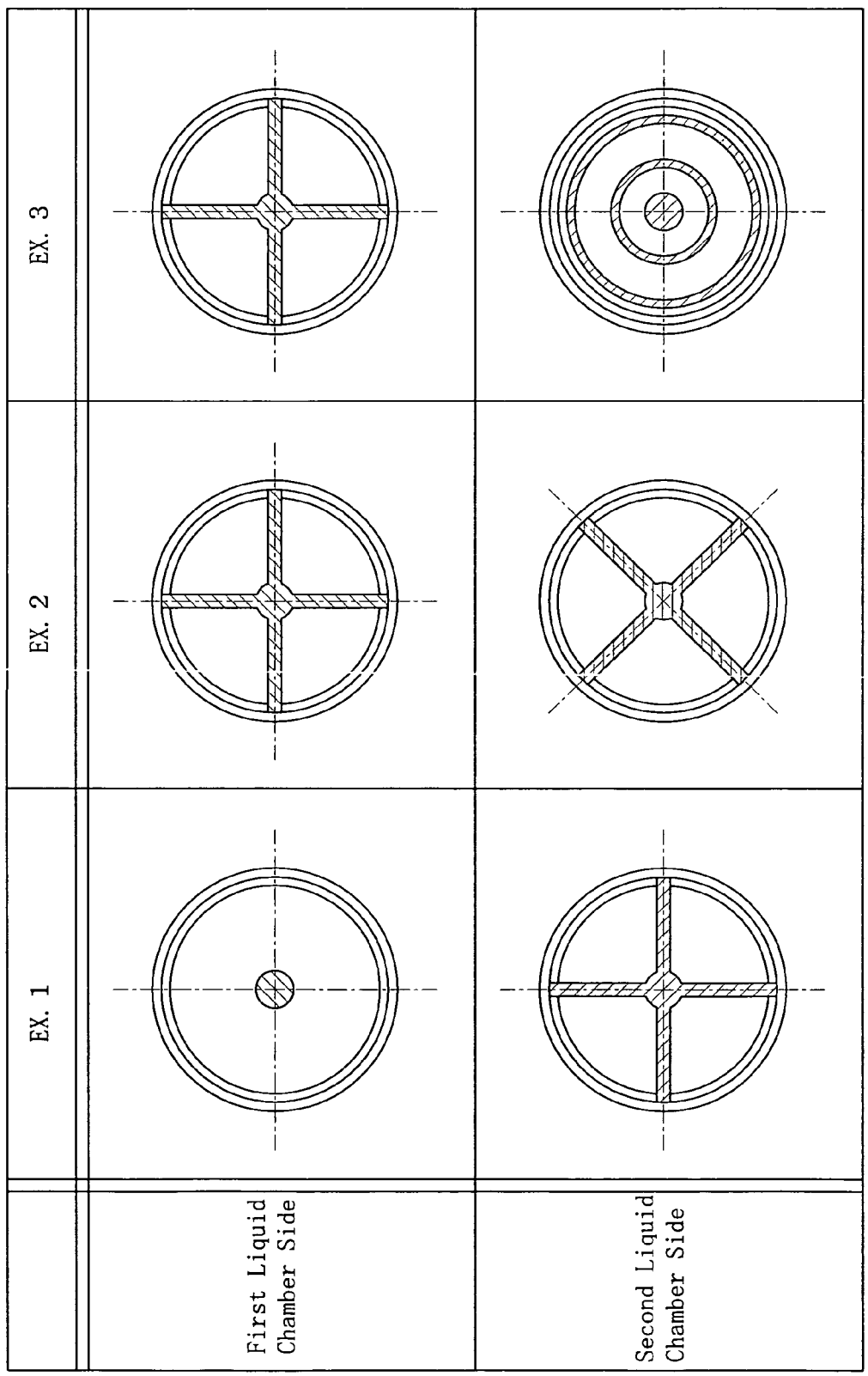
FIG. 19 is an illustrative representation of Examples 1 to 3 showing respective top planes and bottom planes of them.

More particularly, three kinds of the elastic partition membranes (hereinafter referred to as "Comparative Examples 1~3") as illustrated in FIG. 18 and three kinds of the elastic partition membranes (hereinafter referred to as "Examples 1~3") as illustrated in FIG. 19, namely six kinds in total of the elastic partition membranes were measured of strange sounds.

For a better understanding, FIGS. 18 and 19 are depicted by hatching the first and second displacement-regulating protrusions, with the first and second auxiliary protrusions being omitted.

Here, the only difference between Comparative Examples 1~3 and Examples 1~3 consists in the configurations of the first and second displacement-regulating protrusions, and all other shapes and characteristics (thickness dimension of the elastic partition membrane, rubber hardness, etc.) are the same.

As shown in FIGS. 18 and 19, with Comparative Examples 1~3, the displacement-regulating protrusions on the one face are disposed symmetrically relative to the phantom plane F passing through the center of the elastic partition membrane in its thickness direction to those on the other face whereas with Examples 1~3, these are disposed asymmetrically. The elastic partition membrane 115 described in the second embodiment corresponds to Example 2.

Figure 20:
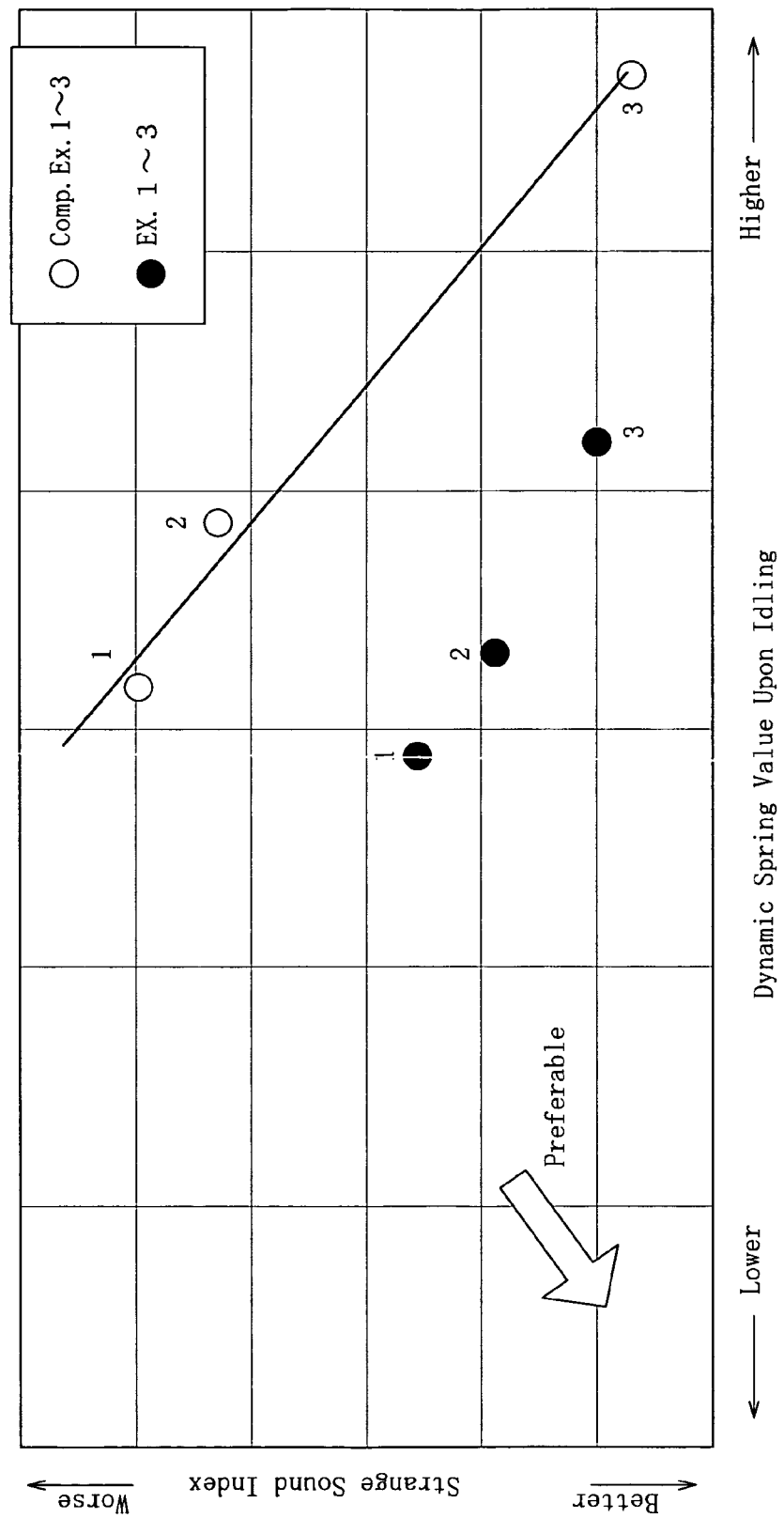
FIG. 20 is a graphical representation showing results of a strange sound evaluation test.

FIG. 20 is a graphical representation showing the evaluation test results of strange sounds on Comparative Examples 1~3 and Examples 1~3. The coordinate indicates acceleration value as a strange sound index output from the body frame side (the second attachment fitting 102 side) when a predetermined vibration (frequency: 15 Hz, amplitude: ±1 mm) from the engine side (the first attachment fitting 101 side) is input. The abscissa indicates dynamic spring value upon idling (frequency: 30 Hz, frequency: ±0.05 mm).

Here, the hydraulic antivibration device 200 is required to meet two characteristics: the one is a low dynamic spring when a small amplitude is input upon idling (generally speaking, frequency: 20 Hz~40 Hz, amplitude: ±0.05 mm~±0.1 mm) and the other is a reduction of strange sounds when a large amplitude such as cranking vibration is input (in general, frequency: 10 Hz ~20 Hz, amplitude: ±1 mm~±2 mm). Consequently, as a strange sounds evaluation test, it can be said that the more preferable results are the left lower area in FIG. 20, where the strange sound index is better and the dynamic spring value upon idling becomes lower.

When comparing the measurement values in FIG. 20, with Examples 1~3, when the restraining area of the elastic partition membrane by the first and second displacement-regulating protrusions is widened (cf. FIGS. 18 and 19), similarly to Comparative Examples 1~3, the stiffness of the elastic partition membrane becomes higher, resulting in a better strange sound index, but the elastic partition membrane becomes difficult to move, so that Examples 1~3 show the tendency that the dynamic spring value upon idling is aggravated.

However, as FIG. 20 indicates, it was corroborated that Examples 1~3 enable it to enhance more the strange sound index as compared with Comparative Examples 1~3 on condition that the dynamic spring value upon idling is equal, whereas it is possible to make the dynamic spring value upon idling lower on condition that the strange sound index value is equal. This is ascribable to the asymmetric arrangement of the displacement-regulating protrusions on the one face side relative to those on the other face side.

For example, Example 2 is of such arrangement that the first and the second displacement-regulating protrusions 151a, 151b are disposed to be mutually deviated in the circumferential direction to those in Comparative Example 1 (namely, disposed in asymmetric positions relative to the phantom plane F passing through the center of the elastic partition membrane 115 in the thickness direction), and when comparing Example 2 and Comparative Example 1, it can be corroborated that Example 2 can achieve a reduction in strange sound index of ca. 60% while ensuring the dynamic spring value upon idling equal to Comparative Example 1.

Figure 22A:
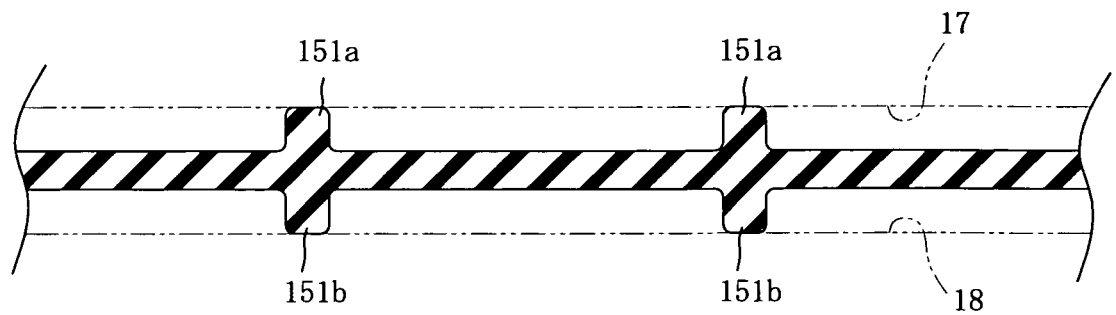
FIG. 22 (a) through FIG. 22 (c) are diagrammatic developments taken on G-G line in FIG. 21 (a) and show deformation states of the elastic partition membrane.
Figure 22B:
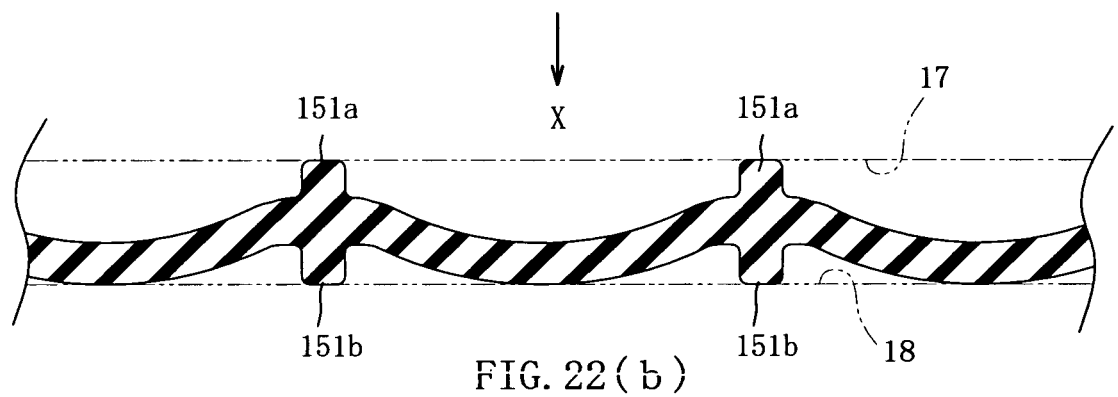
Figure 22C:
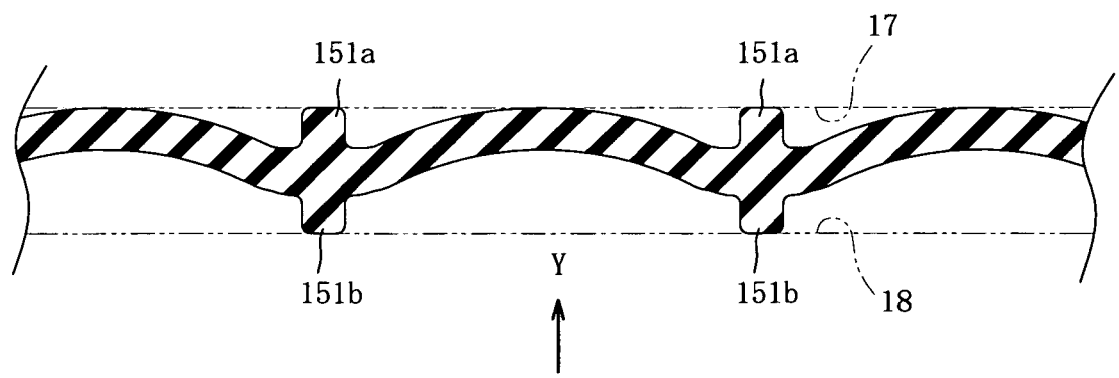
Figure 23A:
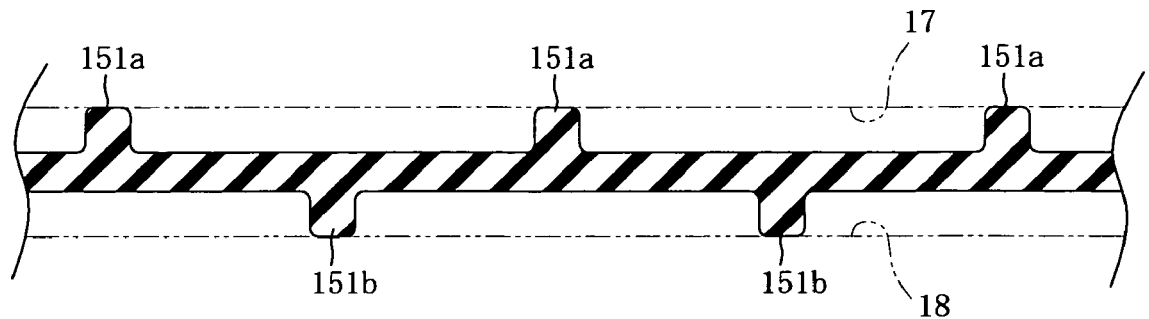
FIG. 23 (a) through FIG. 23 (c) are diagrammatic developments taken on H-H line in FIG. 21 (b) and show deformation states of the elastic partition membrane.
Figure 23B:
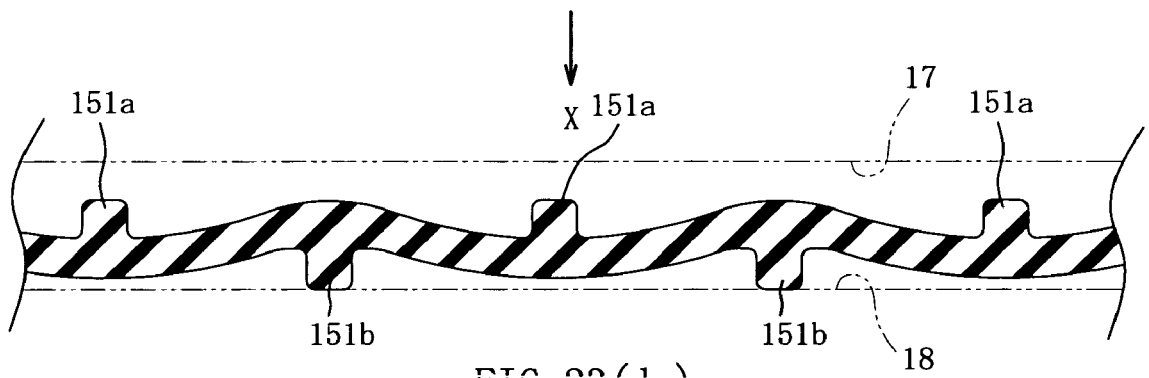
Figure 23C:
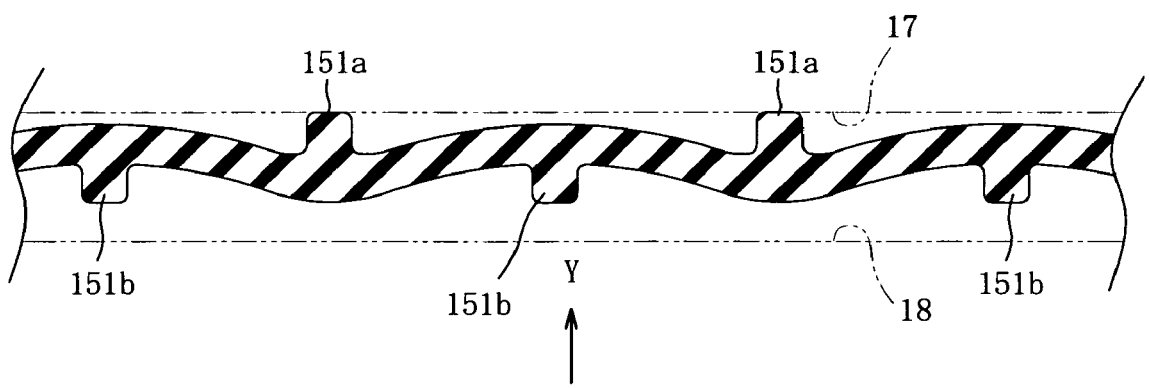

Referring to FIGS. 21 to 23, how the elastic partition membranes of Comparative Example 1 and Example 2 above are displaced upon inputting of a large amplitude will be described in comparison with each other. In FIGS. 21 to 23, the illustration of the auxiliary protrusions 152a, 152b is omitted.

The elastic partition membrane in Comparative Example 1 has, on the one face and the other face thereof, the first and the second displacement-regulating protrusions 151a, 151b disposed symmetrically, as shown in FIG. 22 (a). When a hydraulic pressure fluctuation is transmitted by inputting of a large amplitude through the lattice holes 154 (not shown) to the elastic partition membrane, the elastic partition membrane is, as shown in FIG. 22 (b) or FIG. 22 (c), displaced toward the hydraulic pressure direction (the arrow mark direction X or Y), namely from a higher hydraulic pressure side toward a smaller one side.

Here, the elastic partition membrane of Comparative Example 1 is displaced at its non-displacement-regulating part (the area where the displacement toward the hydraulic pressure direction by the first and second displacement-regulating protrusions 151a, 151b is not restrained) and in particular, the displacement amount in the nearly intermediate position having a smallest stiffness reaches a maximum. As a result, as shown in FIG. 22 (b) or FIG. 22 (c), nearly intermediate position of the non-displacement-regulating part impinges on the partition membrane displacement-regulating member 17 or the lattice wall 18 to generate strange sounds.

In contrast, with the elastic partition membrane of Example 2 as shown in FIG. 23 (a), the first displacement-regulating protrusions 151a on the one face are disposed asymmetrically to the second displacement-regulating protrusions 151b on the other face. More specifically, the first displacement-regulating protrusions 151a (or the second displacement-regulating protrusions 151b) are provided projectingly in an intermediate position between the second displacement-regulating protrusions 151b (or the first displacement-regulating protrusions 151a), namely on the opposite face side in the area where the displacement amount of the elastic partition membrane becomes a maximum and most susceptible to contact with the lattice member.

Therefore, even though the elastic partition membrane of Example 2 is displaced in the hydraulic pressure direction (the arrow direction X or Y) by inputting of a large amplitude, as shown in FIG. 23 (b) or FIG. 23 (c), the stiffness of the intermediate position area of the non-displacement-regulating part, namely the area where a contribution percentage to generation of strange sounds is largest is reinforced convergently by the first or the second displacement-regulating protrusions 151a, 151b, so that the intermediate position area of the non-displacement-regulating part is made difficult to displace while suppressing a rise in stiffness of the overall elastic partition membrane thereby effectively reducing strange sounds upon inputting of a large amplitude.

As a result, according to the elastic partition membrane of Example 2, only the stiffness of the portions necessitated for reduction of strange sounds is intensified convergently thereby to retain a low dynamic spring characteristic upon inputting of a small amplitude, yet the elastic partition membrane is made difficult to contact with the lattice members thereby to reduce effectively strange sounds upon inputting of a large amplitude. Thus it is possible to meet the two mutually contrary requirements to a high degree.

So far, the description has been made of the invention on the basis of the second embodiment, but is not construed as limiting the invention to it, and it will be appreciated that various improvements and modifications may be made within the purview of the invention without departing from the spirit of the invention.

In the second embodiment above, the example where four pieces of the first displacement-regulating protrusions 151a are configured from the axis center T toward outwardly in a radial rectilinear fashion has been described, but this number is not limitative at all. For example, it is naturally possible to choose the number of three pieces or less or five pieces or more. This is also true with the number of the second displacement-regulating protrusions 151b.

Again in the second embodiment above, the example where the first and the second displacement-regulating protrusions 151a, 151b are disposed in a radial fashion relative to the axis center T of the elastic partition membrane 115 has been described, but the invention is not necessarily limited to this pattern, and another pattern is naturally applicable.

As another pattern, for example, a pattern of annular arrangement relative to the axis center T a pattern of a combination of radial arrangement and annular arrangement, etc. are exemplified. By the term "radial" is not always meant rectilinear, but it includes the meaning of a swirling curve. On the other hand, the meaning of the term "annular" is not always a complete circle, but includes also ellipsoidal, polygonal, etc.

In the second embodiment above, the example where the first and the second displacement-regulating protrusions 151a, 151b are provided so as to project from the elastic partition membrane 11 has been described, but it is not always necessary to project these both displacement-regulating protrusions 151a, 151b from the elastic partition membrane 115. If only at least the one of the displacement-regulating protrusions 151a or 151b are provided on the one face of the elastic partition membrane 115 and both displacement-regulating protrusions 151a, 151b are disposed mutually asymmetrically, it is naturally possible to construct so that the other of the displacement-regulating protrusions 151b or 151a are provided so as to project from the partition membrane displacement-regulating member 117 or the lattice wall 118.

Further in the second embodiment above, the example where the elastic partition membrane 115 is provided with the first and the second auxiliary protrusions 152a, 152b in a projecting manner has been described, but it is not always necessary to provide these projectingly and it is naturally possible to omit the projective provision of the one or both of these first and second auxiliary protrusions 152a, 152b.

Where the projective provision of the first and second auxiliary protrusions 152a, 152b is omitted, embossing processing may be applied to the surface of the non-displacement-regulating part (the area where the first and second displacement-regulating protrusions 151a, 151b are not provided) of the elastic partition membrane 115. It is naturally possible also to apply embossing processing to the surface of the first and second auxiliary protrusions 152a, 152b. Thereby it is possible to make the elastic partition membrane 115 to impinge moderately on the partition membrane displacement-regulating member 117 or the lattice wall 118 to achieve the reduction of strange sounds.

In the second embodiment above, the first and second displacement-regulating protrusions 151a, 151b in the assembled state of the partition 112 are set in a protrusion height so that the tops of them may abut on the partition membrane's displacement-regulating member 117 or the lattice wall 118, but are not necessarily limited to that height, and the protrusion height may be set so that a clearance is formed between the tops and the partition membrane displacement-regulating member 117 or the lattice wall 118. Such clearance is preferred to be ca. 0.3 mm or less in the assembled state of the partition 112.

Again in the foregoing second embodiment, the example where the elastic partition membrane 115 is employed for the hydraulic antivibration device 200 of a so called single orifice type, wherein the first liquid chamber 11A and the second liquid chambers 11B are put in communication with each other through one piece of the orifice 125, has been described, but this invention is not necessarily limited to this type, and naturally applicable to a double-orifice type of hydraulic antivibration device.

By the term "double-orifice type hydraulic antivibration device" is meant the one comprised of a main liquid chamber, a first and a second subsidiary liquid chambers, and a first and a second orifices communicating with the first and the second subsidiary liquid chambers and the main liquid chamber respectively.

INDUSTRIAL APPLICABILITY

According to the hydraulic antivibration device of the first invention, it is possible to bring a plurality of the first ribs into the state that the tops thereof are spaced apart from the lattice members and to bring a plurality of the second ribs on either face of the elastic partition membrane into the state that tops of them abut on the lattice members. Thereby when the elastic partition membrane advances toward the lattice member side, attended on vibration, the second ribs resist to allow the tops of the first ribs to impinge slowly on the faces of the lattice members, and consequently, the effect accrues that strange sounds can be sufficiently reduced.

Further since the first ribs and the second ribs exist in a mutually mingled fashion and the second ribs are made smaller in width than the first ribs to weaken the stiffness, the effect accrues that it is possible to obviate the elastic partition membrane from being difficult to reciprocate.

In accordance with the hydraulic antivibration device of the second invention, the additional effect to the effects achieved by the hydraulic antivibration device of the first invention accrues that because the second ribs are disposed on the faces of the elastic partition membrane in a distributed manner, it is possible to prevent a resistance force of a plurality of the second ribs from concentrating on a part of the elastic partition membrane. And besides because the first ribs are disposed on the faces of the elastic partition membrane so as to be capable of surrounding the lattice holes every a predetermined number of them, under a large amplitude vibration condition where the tops of the first ribs abut on the lattice member, the first ribs surround the lattice holes every the predetermined number of them thereby obviating the flowing of fluid between the predetermined number of the lattice holes and other lattice holes. Thus a further effect accrues in that it is possible to enhance more the vibration-proof performance.

According to the hydraulic antivibration device of the third invention, in addition to the effects achieved by the hydraulic antivibration device of the second invention, a further effect accrues in that because under a large amplitude vibration condition where the tops of the first ribs abut on the lattice member, a plurality of the first ribs can surround the lattice holes every one lattice hole row and can prevent the liquid from fluidizing between the lattice holes of a certain lattice hole row and the lattice holes of adjacent lattice hole row to it, it is possible to enhance more the antivibration performance.

Again since the second ribs are disposed in a radial fashion relative to the axis center of the elastic partition membrane, a further effect accrues in that it is possible to preclude that the resistance force of a plurality of the second ribs concentrates on a part of the elastic partition membrane.

According to the hydraulic antivibration device of the fourth invention, in addition to the effects achieved by the one of the first invention, the effect accrues: because the first ribs and the second ribs are arranged on the faces of the elastic partition membrane so as to be capable of surrounding the lattice holes every a predetermined number of them, under a large amplitude vibration condition where the tops of the first ribs abut on the lattice member, the first ribs and the second ribs surround the lattice holes every the predetermined number of them, and consequently, it is possible to prevent the fluid from flowing between the predetermined number of the lattice holes and other lattice holes, thus enhancing more the antivibration performance.

According to the hydraulic antivibration device of the fifth invention, because the ribs play the role of a cushion when the elastic partition membrane impinges on the lattice members, attended with vibration, it is possible to bring the elastic partition membrane into moderate impingement on the lattice members, which results in the effect that strange sounds can be reduced.

And under a large amplitude vibration condition where the tops of the ribs abut on the lattice members, the ribs surround the lattice holes every a predetermined number of them, and consequently, it is possible to avoid the fluidization of fluid between the predetermined number of the lattice holes and the other lattice holes, thus preventing a reduction in antivibration performance.

Further because the one lattice member of a pair of the lattice members is provided to link integrally with the cylinder member between inner peripheral faces thereof, it is possible to set the posture of the lattice member to the cylinder member (for example, the perpendicularity of the cylinder member to the axis center) accurately as compared with the construction such that either of the lattice members is configured of a separate member from the cylinder member. Moreover it is possible to set accurately the distance between both lattice members when the other lattice member is attached to the cylinder member, and to set accurately the clearance between the elastic partition membrane and the both lattice members, accordingly. Therefore the effect accrues that it is thereby possible to more enhance the antivibration performance.

According to the hydraulic antivibration device of the sixth invention, it is possible to bring about the states that the tops of a plurality of the ribs are spaced apart from the lattice members and the tops of a plurality of the auxiliary ribs on either face of the elastic partition membrane abut on the lattice members. Thereby when the elastic partition membrane advances toward the lattice members with vibration, the auxiliary ribs resist thereby to allow the tops of the ribs to impinge moderately on the lattice members, and consequently, the effect accrues that strange sounds can be sufficiently reduced.

Further effect accrues in that because the auxiliary ribs are disposed on the faces of the elastic partition membrane in a distributed manner, it is possible to preclude that the resistance force of a plurality of the auxiliary ribs concentrates on a part of the elastic partition membrane and concurrently because the auxiliary ribs are made smaller in width than the ribs, thus being made weak in stiffness, it is possible to preclude that the elastic partition membrane becomes difficult to reciprocate.

And under a large amplitude vibration condition where the tops of the ribs abut on the lattice members, the ribs surround the lattice holes every a predetermined number of them, and hence, it is possible to preclude that the fluid fluidizes between the predetermined number of the lattice holes and other lattice holes than these, which results in the effect that it is possible to more enhance the antivibration performance.

According to the hydraulic antivibration device of the seventh invention, in addition to the effects achieved by the hydraulic antivibration device of the sixth invention, the following effect accrues: because under a large amplitude vibration condition where the tops of the ribs abut on the lattice members, a plurality of the ribs surround the lattice holes every one lattice hole row, and hence, it is possible to preclude that the liquid fluidizes between the lattice holes of an arbitrary lattice hole row and the lattice holes of an adjacent lattice hole row thereto and ultimately it is possible to prevent a reduction in antivibration performance.

Again since the auxiliary ribs are disposed in a radial fashion relative to the axis center of the elastic partition membrane, further effect accrues that it is possible to avoid concentration of the resistance force of the plural auxiliary ribs on a part of the elastic partition membrane.

According to the hydraulic antivibration device of the eighth invention, the device has the first displacement-regulating protrusions provided projectingly on the one face side of the elastic partition membrane and the second displacement-regulating protrusions provided projectingly on the other face side of the elastic partition membrane or the lattice member facing the other face side. Thus when the elastic partition membrane is displaced toward the lattice member, attended with the large amplitude vibration, the displacement of the elastic partition membrane can be regulated by the first or the second displacement-regulating protrusions disposed on the displacement direction side, so that the effect accrues that it is possible to suppress the impingement between the elastic partition membrane and the lattice member to reduce strange sounds.

Further the elastic partition membrane is, at least on its one face side, provided with the first displacement-regulating protrusions in an asymmetric position to the second displacement-regulating protrusions. Because of that, when the elastic partition membrane is displaced toward the lattice member on the second displacement-regulating protrusions side, attended with the large amplitude vibration, the first displacement-regulating protrusions provided projectingly on the opposite side to the displacement direction can reinforce locally the stiffness of the elastic partition membrane thereby making the displacement of the elastic partition membrane difficult. Consequently there accrues the effect that by that amount, it is possible to suppress the contact of the elastic partition membrane with the lattice member to achieve a further reduction of strange sounds.

On the other hand, the first and the second displacement-regulating protrusions are disposed in a mutually asymmetric position relation, whereby it is possible to make the influence that the one displacement-regulating protrusions give on the stiffness of the non-displacement regulating part on the other displacement-regulating protrusions side smaller, and hence, the effect accrues that while suppressing the stiffness of the entire elastic partition membrane to a low degree, it is possible to suppress effectively the contact of the elastic partition membrane with the lattice members. Stated another way, it is possible to reduce strange sounds upon inputting of a large amplitude, while maintaining a low dynamic spring characteristic upon inputting of a small amplitude.

Here, the contribution degree to generation of strange sounds differs greatly depending upon whether the party with which the elastic partition membrane contacts is the lattice member on the first liquid chamber side or the lattice member on the second liquid chamber side. According to the construction described above wherein the first and the second displacement-regulating protrusions are displaced in mutually asymmetric positions, it is possible to adjust appropriately the stiffness ratio of the one face side to the other face side of the elastic partition membrane. Hence, while elevating the stiffness of the one face side thereby to make it difficult for the elastic partition membrane to contact with the lattice member whose contribution degree to generation of strange sounds is larger, the stiffness of the other face side is made lower, whereby it is possible to suppress a rise in stiffness of the entirety of the elastic partition membrane. As a consequence, there is the effect that mutually contrary requirements of a reduction of strange sounds upon inputting of a large amplitude and the maintaining of a low dynamic spring characteristic upon inputting of a small amplitude can be satisfied.

According to the hydraulic antivibration device of the ninth invention, in addition to the effects achieved by the one of the eighth invention, the further effect accrues: because the second displacement-regulating protrusions are provided projectingly from the other face side of the elastic partition membrane, a complex working to the lattice members is dispensed with and the production cost attended on the formation of the second displacement-regulating protrusions can be reduced, and by that amount, a reduction of product cost as an overall hydraulic antivibration device can be achieved.

According to the hydraulic antivibration device of the tenth invention, in addition to the effects achieved by the hydraulic antivibration device of the eighth or ninth invention, the effect accrues: because at least part of the first and the second displacement-regulating protrusions is disposed in a radial fashion relative to the axis center of the elastic partition membrane, it is possible to make it difficult for the elastic partition membrane to contact with the lattice member thereby to reduce strange sounds upon inputting of a large amplitude, while suppressing a rise in stiffness of the elastic partition membrane as a whole thereby to maintain a low dynamic spring characteristic upon inputting of a small amplitude.

Further at least a part of the first displacement-regulating protrusions are provided in an intermediate position between the second displacement-regulating protrusions, namely in the area where the elastic partition membrane reaches a largest displacement amount and is most susceptible to contact with the lattice member. Therefore it is possible to reinforce convergently the stiffness only of the area where the contribution degree to generation of strange sounds is largest by the first displacement-regulating protrusions, and hence, it is possible to reduce effectively strange sounds upon inputting of a large amplitude while suppressing a rise in stiffness of the entirety of the elastic partition membrane. As a result, the effect accrues that it is possible to meet highly the mutually contrary requirements of: a reduction of strange sounds upon inputting of a large amplitude by making the contact of the elastic partition membrane with the lattice member difficult while maintaining a low dynamic spring characteristic upon inputting of a small amplitude.

According to the hydraulic antivibration device of the eleventh invention, in addition to the effects achieved by the one of the ninth invention, the following effect accrues: because the first and the second displacement-regulating protrusions respectively in n pieces, are disposed in a radial fashion and equidistantly in the circumferential direction, and the first displacement-regulating protrusions are deviated circumferentially by a rotation angle of ca. $\pi/n$ to the second displacement-regulating protrusions, namely, each the first displacement-regulating protrusion is disposed in the intermediate position between mutually adjacent second displacement-regulating protrusions, it is possible to reinforce convergently the stiffness only of the area whose contribution rate to generation of strange sounds is large, while suppressing a rise in stiffness of the elastic partition membrane as a whole. As a consequence, it is possible to meet, to a high degree, mutually contrary requirements that strange sounds should be reduced upon inputting of a large vibration amplitude while maintaining a low dynamic spring characteristic upon inputting of a small vibration amplitude.

Further because the first and the second displacement-regulating protrusions are configured in mutually substantially the same protrusion height and the same protrusion width, it is possible to render the stiffness of the elastic partition membrane on its both faces approximately the same. Therefore in the assembling process of the hydraulic antivibration device, in incorporating the elastic partition membrane between the lattice members of the partition, there is no necessity of identifying the elastic partition membrane as to the reverse face or the front face thereof, and hence further effect accrues in that the incorporating work is simplified and by that amount, a reduction in working cost can be achieved.

Further effect in the assembling process is that even though any working person errs in the incorporating direction of the reverse and front faces of the elastic partition membrane, it is possible to suppress and minimize the influence affecting on strange sounds because stiffness of the elastic partition membrane is the same on the reverse and front faces.

According to the hydraulic antivibration device of the twelfth invention, in addition to the effects achieved by the hydraulic antivibration device of any one of the eighth invention to the eleventh inventions, the following effect accrues: because the first and the second displacement-regulating protrusions are configured in a height that the tops of them can abut on the lattice member or the elastic partition membrane, namely, in the state that there is no clearance between the respective displacement-regulating protrusions and the elastic partition membrane or the lattice member, when the elastic partition membrane is displaced toward the lattice members, attended with vibration, it is possible to avoid the contact of the respective displacement-regulating protrusions with the elastic partition membrane or the lattice member that causes to generate strange sounds.

According to the hydraulic antivibration device of the thirteenth invention, in addition to the effects achieved by the hydraulic antivibration device of any one of the eighth invention to the twelfth invention, the effect accrues that because the elastic partition membrane is provided on the one face side and the other face side thereof with the auxiliary protrusions, even though the elastic partition membrane contacts with the lattice members, it is possible to bring the tops of the auxiliary protrusions into contact with the lattice members, thereby rendering the contact area with the lattice members small and simultaneously making a moderate contact of the elastic partition membrane with the lattice members by the cushioning action of the auxiliary protrusions, so that it is possible to achieve a reduction of strange sounds by that amount.

A further effect accrues in that because the auxiliary protrusions are constructed lower in protrusion height and narrower in protrusion width than at least the first displacement-regulating protrusions, it is possible to suppress that the stiffness of the elastic partition membrane as a whole is raised, to maintain a low dynamic spring characteristic upon inputting of a small amplitude.

According to the elastic partition membrane of the fourteenth invention, it is possible to achieve a similar effect to that of the elastic partition membrane used for the hydraulic antivibration device of any one of the first to the thirteenth inventions.

The invention claimed is:

1. A hydraulic antivibration device comprising:
   a first attachment fitting,
   a cylindrical second attachment fitting,
   a vibration-isolating base connecting the second attachment fitting and the first attachment fitting to each other and composed of an elastomer,
   a diaphragm attached to the second attachment fitting to form a liquid-filled chamber between the diaphragm and the vibration-isolating base,
   a partition comparting the liquid-filled chamber into a first liquid chamber on the vibration-isolating base side and a second liquid chamber on the diaphragm side, and
   an orifice putting the first liquid chamber and the second liquid chamber into communication with each other, the partition including an elastic partition membrane and a pair of lattice members regulating the displacement amount of the elastic partition membrane from both sides thereof,
   wherein rib groups are provided projectingly on both faces of the elastic partition membrane, and include a plurality of first ribs and a plurality of second ribs, said first ribs intersecting with said second ribs,
   wherein the first ribs are set in height dimension so that tops thereof may be situated to be spaced apart from the lattice members; and
   wherein the second ribs are set in height dimension so that tops thereof may abut on the lattice members and in a rib width smaller than the first ribs.

2. The hydraulic antivibration device as set forth in claim 1, wherein the first ribs are disposed on the faces of the elastic partition membrane so as to surround a predetermined number of lattice holes; and
   wherein the second ribs are disposed on the faces of the elastic partition membrane in a distributed manner.

3. The hydraulic antivibration device as set forth in claim 2, wherein the lattice holes are disposed in a plurality of rows in the circumferential direction of the lattice members;
   wherein said plurality of the first ribs are formed in an annular form and abut on respective lattice member portions on radially both sides of respective lattice hole rows of the lattice members; and wherein said plurality of the second ribs are disposed in a radial fashion relative to an axis center of the elastic partition membrane.

4. The hydraulic antivibration device as set forth in claim 1, wherein the first ribs and the second ribs are disposed on the faces of the elastic partition membrane so as to surround a predetermined number of lattice holes.

5. A hydraulic antivibration device comprising:
a first attachment fitting,
a cylindrical second attachment fitting,
a vibration-isolating base connecting the second attachment fitting and the first attachment fitting to each other and composed of an elastomer,
a diaphragm attached to the second attachment fitting to form a liquid-filled chamber between the diaphragm and the vibration-isolating base,
a partition comparting the liquid-filled chamber into a first liquid chamber on the vibration-isolating base side and a second liquid chamber on the diaphragm side, and
an orifice putting the first liquid chamber and the second liquid chamber into communication with each other, the partition including an elastic partition membrane, a cylinder portion accommodating the elastic partition membrane, and a pair of lattice members regulating the displacement amount of the elastic partition membrane within the cylinder portion from both sides thereof, wherein one lattice member of the pair of the lattice members is provided to link integrally with the cylinder portion between inner peripheral faces of the cylinder portion;

wherein the elastic partition membrane is provided on both faces thereof with a plurality of first ribs surrounding a predetermined number of lattice holes and with a plurality of auxiliary ribs disposed in a distributed manner;

wherein said first ribs are set in height dimension so that tops of thereof may be situated to be spaced apart from the lattice members;

wherein said auxiliary ribs are set in height dimension so that tops thereof may abut on the lattice members and in a rib width smaller than the ribs, wherein the lattice holes are disposed in a plurality rows in the circumferential direction of the lattice members;

wherein said plurality of first ribs are configured in an annular form so that they may abut on portions of the lattice members on radially both sides of the respective lattice hole rows of the lattice members; and wherein said auxiliary ribs radially extend relative to the axis center of the elastic partition membrane.

* * * * *